United States Patent
Zhu

(10) Patent No.: US 10,545,960 B1
(45) Date of Patent: Jan. 28, 2020

(54) SYSTEM AND METHOD FOR SET OVERLAP SEARCHING OF DATA LAKES

(71) Applicant: THE GOVERNING COUNCIL OF THE UNIVERSITY OF TORONTO, Toronto (CA)

(72) Inventor: Er Kang Zhu, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 16/299,798

(22) Filed: Mar. 12, 2019

(51) Int. Cl.
G06F 17/30 (2006.01)
G06F 16/2453 (2019.01)
G06F 16/22 (2019.01)
G06F 16/953 (2019.01)

(52) U.S. Cl.
CPC .... *G06F 16/24545* (2019.01); *G06F 16/2282* (2019.01); *G06F 16/24537* (2019.01); *G06F 16/953* (2019.01)

(58) Field of Classification Search
CPC ........... G06F 16/24545; G06F 16/2282; G06F 16/953; G06F 16/24537
See application file for complete search history.

(56) References Cited

U.S. PATENT DOCUMENTS

| | | | | |
|---|---|---|---|---|
| 7,080,091 B2* | 7/2006 | Matsuda | ............... | G06F 16/319 |
| 7,533,245 B2* | 5/2009 | Frieder | ............... | G06F 16/316 712/32 |
| 7,792,840 B2* | 9/2010 | Whang | ............... | G06F 16/319 707/742 |
| 9,116,940 B1* | 8/2015 | Gupta | ............... | G06F 16/24578 |
| 9,251,197 B2* | 2/2016 | Raufman | ............... | G06F 7/78 |
| 9,405,790 B2* | 8/2016 | Raufman | ............... | G06F 7/78 |
| 10,140,326 B2* | 11/2018 | Sherkat | ............... | H03M 7/60 |
| 10,229,143 B2* | 3/2019 | Hopcroft | ............... | G06F 16/316 |
| 2011/0040761 A1* | 2/2011 | Flatland | ............... | G06F 16/319 707/737 |
| 2014/0114942 A1* | 4/2014 | Belakovskiy | ......... | G06F 16/328 707/706 |

(Continued)

OTHER PUBLICATIONS

Roberto J. Bayardo, Yiming Ma, and Ramakrishnan Srikant. Scaling up all pairs similarity search. WWW 2007, May 8-12, 2007, Banff, Alberta, Canada. 131-140.

(Continued)

*Primary Examiner* — Debbie M Le
(74) *Attorney, Agent, or Firm* — Anil Bhole; Marc Lampert; Bhole IP Law

(57) ABSTRACT

There is provided a system and method for set overlap searching of a data lake. The method includes: receiving input tables; generating an inverted index from the input tables; receiving a query set of data values to be searched; receiving a requested set quantity; while a comparison condition is true, the comparison condition based on at least a size of the query set, iteratively performing: determining whether a first net cost of reading a candidate set is greater than a second net cost of reading an unread one of the posting lists; where its true, adding the unread one of the posting lists to the candidate set; and where its negative, determining whether the overlap between the query set and the candidate set is greater than the lowest ranked candidate set in a heap, and adding the candidate set to the heap.

16 Claims, 16 Drawing Sheets

(56) References Cited

U.S. PATENT DOCUMENTS

2018/0129731 A1* 5/2018 Carmel ................... G06F 16/93
2018/0210922 A1* 7/2018 Schulze .............. G06F 16/2453
2018/0276264 A1* 9/2018 Zheng ..................... G06F 16/00

OTHER PUBLICATIONS

Christopher D. Manning, Prabhakar Raghavan, and Hinrich Schutze. Introduction to Information Retrieval. Apr. 1, 2009 Cambridge University Press.
Chuan Xiao, WeiWang, Xuemin Lin, and Haichuan Shang. 2009. Top-k Set Similarity Joins. In ICDE. 916-927.
Chuan Xiao, WeiWang, Xuemin Lin, and Jeffrey Xu Yu. Efficient similarity joins for near duplicate detection. WWW 2008, Apr. 21-25, 2008, Beijing, China 131-140.
Surajit Chaudhuri, Venkatesh Ganti, and Raghav Kaushik. 2006. A Primitive Operator for Similarity Joins in Data Cleaning. In ICDE. 5.

* cited by examiner

|  | Facility | Company | Postal | NOx |
|---|---|---|---|---|
| | 251 | 252 | 253 | 254 |
| 205 | Facility | Company | Postal | NOx |
| 210 | Oil Sands 211 | Suncor 212 | T9H3E3 213 | 9340.81 214 |
| 220 | Carberry 221 | McCain 222 | R0K0H0 223 | 50.71 224 |
| 230 | Grand Falls 231 | McCain 232 | E3Y4A5 233 | 60.06 234 |
| 240 | Ingleside 241 | Kraft 242 | K0C1M0 243 | -99 244 |

| | 351 | 352 | 353 | 354 |
|---|---|---|---|---|
| 305 | Contributor | Postal Code | Recipient Party | Amount |
| 310 | E*, B* 311 | T9H3E3 312 | Liberal 313 | 397.46 314 |
| 320 | J*, S* 321 | R0K0K0 322 | Conservative 323 | 500.00 324 |
| 330 | J*, S* 331 | R0K0K0 332 | Conservative 333 | 250.00 334 |
| 340 | M*, S* 341 | K0C1M0 342 | Liberal 343 | 400.00 344 |

FIG. 3

SYSTEM AND METHOD FOR SET OVERLAP SEARCHING OF DATA LAKES

TECHNICAL FIELD

The following relates generally to data lake analytics, and more particularly, to systems and methods for set overlap searching of data lakes.

BACKGROUND

Data lakes are repositories of data that typically hold vast amounts of data. Data lakes can typically have massive set sizes (for example, with maximum set sizes that may be tens of millions) and can have massive dictionaries (for example, with hundreds of millions of distinct values). For example, modern data lakes can include a private enterprise data lake or a public data lake like Open Government Data or Web Tables. Generally, when conducting data location on data lakes, a user's computing device inputs a table and identifies a join column. A searching system then attempts to find tables that can be joined with the user-provided table on the largest number of distinct values.

SUMMARY

In an aspect, there is provided a computer-implemented method for set overlap searching of a data lake, the data lake having input tables associated therewith, the input tables comprising table columns and data values, the input tables having an inverted index associated therewith, the inverted index comprising the data values and respective posting lists, the posting lists comprising pointers to sets of the table columns, the method comprising: receiving a query set of data values to be searched; receiving a requested set quantity; while a comparison condition is true, the comparison condition based on at least a size of the query set, iteratively performing: determining whether a first net cost of reading a candidate set is greater than a second net cost of reading an unread one of the posting lists, the candidate set comprising one of the sets; where the first net cost is greater than the second net cost, reading the unread one of the posting lists from the inverted index and pruning the candidate sets based on a position filter; and where the first net cost is not greater than the second net cost, determining whether the overlap between the query set and the candidate set is greater than the lowest ranked candidate set in a heap, a total rank of the heap based at least on the requested set quantity, and where there is greater overlap, adding the candidate set to the heap; and outputting the heap.

In a particular case, the method further comprising determining the inverted index by: extracting a raw tokens table from the data values of the input tables; building a token table from the raw tokens table; determining the posting lists from the token table; and determining the inverted index by associating each of the data values with the respective posting list.

In another case, wherein extracting the raw tokens table from the input tables comprises: converting the input tables to sets; assigning set identifiers to each of the sets; and determining the raw tokens table as a collection of tuples, the tuples comprising the data values and associated set identifiers.

In yet another case, wherein building the token table from the raw tokens table comprises: determining a first mapping of entries in the raw token table to respective token identifiers; determining duplicate groups by determining starting positions and ending positions of pairs of adjacent posting lists; determining a group identifier for each duplicate group as the starting position and the ending position of such duplicate group; determining a second mapping of the token identifiers to the group identifiers; and joining the first mapping and the second mapping into the token table.

In yet another case, the method further comprising determining integer sets in the token table by: converting strings in the raw token table to integers; determining a resultant table by combining the raw tokens table with the token table; grouping the resultant table by the set identifiers; and sorting the resultant table by the token identifiers.

In yet another case, the method further comprising: determining a dictionary comprising a mapping of the data values to the respective pointers; updating the query set to include only the tokens of the query set that are in the dictionary; sorting the query set using global ordering; initializing a hash map of unread candidate sets to empty; initializing a pointer to one; and assigning a prefix length as a size of the query set minus a size of an overlap between the query set and a candidate set having a rank of the requested set quantity.

In yet another case, wherein the comparison condition is evaluated as true if the pointer is less than or equal to the prefix length or the hash map of unread candidate sets is not empty.

In yet another case, the method further comprising assigning a best unread candidate to the candidate set when the comparison condition is true, the best unread candidate selected to minimize the first net cost.

In yet another case, wherein the first net cost is determined as a time incurred to read the candidate set minus a first read time saved, the first read time saved determined as an addition of a first time and a second time, the first time being the time required to read eliminated posting lists, and the second time being the time required to read eliminated candidate sets.

In yet another case, wherein the second net cost is determined as a time incurred to read the posting lists minus a second read time saved, the second read time saved determined as a sum over all unread candidates sets, the sum comprising a time required to read a next batch of posting lists added to a time required to read a candidate set due to updating the position filter.

In another aspect, there is provided a system for set overlap searching of a data lake, the data lake having input tables associated therewith, the input tables comprising table columns and data values, the input tables having an inverted index associated therewith, the inverted index comprising the data values and respective posting lists, the posting lists comprising pointers to sets of the table columns, the system having one or more processors and a data storage device, the one or more processors in communication with the data storage device and configured to execute: an input module to receive a query set of data values to be searched and receive a requested set quantity; a search engine to, while a comparison condition is true, the comparison condition based on at least a size of the query set, iteratively perform: determining whether a first net cost of reading a candidate set is greater than a second net cost of reading an unread one of the posting lists, the candidate set comprising one of the sets; where the first net cost is greater than the second net cost, reading the unread one of the posting lists from the inverted index and pruning the candidate sets based on a position filter; and where the first net cost is not greater than the second net cost, determining whether the overlap between the query set and the candidate set is greater than the lowest ranked candidate set in a heap, a total rank of the heap based at least on the requested set quantity, and where there is greater overlap, adding the candidate set to the heap; and an output module to output the heap.

In a particular case, wherein the one or more processors are further configured to execute an indexing module to determine the inverted index by: extracting a raw tokens table from the data values of the input tables; building a token table from the raw tokens table; determining the posting lists from the token table; and determining the inverted index by associating each of the data values with the respective posting list.

In another case, wherein extracting the raw tokens table from the input tables comprises: converting the input tables to sets; assigning set identifiers to each of the sets; and determining the raw tokens table as a collection of tuples, the tuples comprising the data values and associated set identifiers.

In yet another case, wherein building the token table from the raw tokens table comprises: determining a first mapping of entries in the raw token table to respective token identifiers; determining duplicate groups by determining starting positions and ending positions of pairs of adjacent posting lists; determining a group identifier for each duplicate group as the starting position and the ending position of such duplicate group; determining a second mapping of the token identifiers to the group identifiers; and joining the first mapping and the second mapping into the token table.

In yet another case, wherein the indexing module is further executable to creating integer sets in the token table by: converting strings in the raw token table to integers; determining a resultant table by combining the raw tokens table with the token table; grouping the resultant table by the set identifiers; and sorting the resultant table by the token identifiers.

In yet another case, wherein the search engine is further executable to: determine a dictionary comprising a mapping of the data values to the respective pointers; update the query set to include only the tokens of the query set that are in the dictionary; sort the query set using global ordering; initialize a hash map of unread candidate sets to empty; initialize a pointer to one; and assign a prefix length as a size of the query set minus a size of an overlap between the query set and a candidate set having a rank of the requested set quantity.

In yet another case, wherein the comparison condition is evaluated as true if the pointer is less than or equal to the prefix length or the hash map of unread candidate sets is not empty.

In yet another case, wherein the search engine is further executable to assign a best unread candidate to the candidate set when the comparison condition is true, the best unread candidate selected to minimize the first net cost.

In yet another case, wherein the first net cost is determined as a time incurred to read the candidate set minus a first read time saved, the first read time saved determined as an addition of a first time and a second time, the first time being the time required to read eliminated posting lists, and the second time being the time required to read eliminated candidate sets.

In yet another case, wherein the second net cost is determined as a time incurred to read the posting lists minus a second read time saved, the second read time saved determined as a sum over all unread candidates sets, the sum comprising a time required to read a next batch of posting lists added to a time required to read a candidate set due to updating the position filter.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

A greater understanding of the embodiments will be had with reference to the figures, in which:

FIG. 2 illustrates an example diagrammatic block diagram of an input table;

FIG. 3 illustrates an example diagrammatic block diagram of a candidate table;

DETAILED DESCRIPTION

Figure 1:
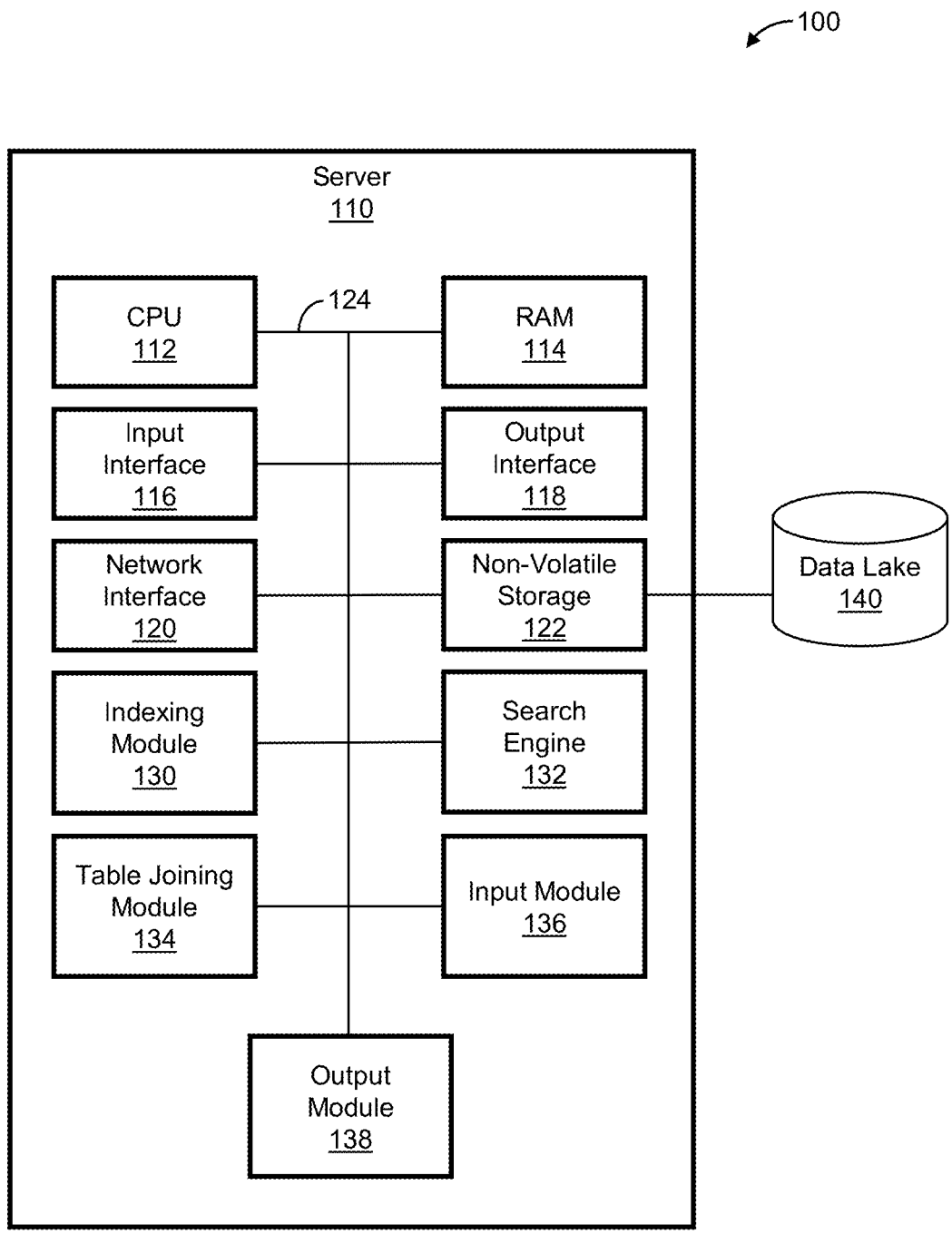
FIG. 1 illustrates a diagrammatic block diagram of a system for set overlap searching of data lakes, according to an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

While the present embodiments are described with respect to data lakes, it is to be understood that the present embodiments can be also applied to any large dataset or database.

With respect to data lakes, a user's computing device typically inputs a table and identifies a join column. A searching system attempts to locate tables that can be joined with the user-provided table on the largest number of distinct values. Thus, it becomes a great challenge for data preparation to find relevant datasets within these massive data lakes. In the present embodiments, this challenge is generally formulated as a set overlap search problem by considering columns as sets and joinable values as overlap between sets. While set overlap search approaches are typically well-studied in the field of approximate string search (e.g., fuzzy keyword search), these approaches are evaluated over sets of relatively small size (for example, with an average set size typically not over 100 and a maximum set size in the low-thousands) with modest dictionary sizes (for example, with a total number of distinct values in all sets of only a few million). Advantageously, the present embodiments provide the ability to find joinable tables in massive data lakes.

Referring now to FIG. 1, a system for set overlap searching of data lakes 110, in accordance with an embodiment, is shown. The system 110 can be communicatively linked to a data lake 140. In an embodiment, the system 110 has a number of physical and logical components, including a central processing unit ("CPU") 112 (comprising one or more processors), random access memory ("RAM") 114, an input interface 116, an output interface 118, a network interface 120, non-volatile storage 122, and a local bus 124 enabling the CPU 112 to communicate with the other components. The CPU 112 executes an operating system, and various modules, as described below in greater detail. RAM 114 provides relatively responsive volatile storage to the CPU 112. The input interface 116 enables an operator to provide input via an input device, such as a keyboard, mouse, touchscreen, scanner, microphone, or camera. The output interface 118 outputs information to output devices, such as a display and/or speakers. In some cases, the input interface 116 and the output interface 118 can be the same device (e.g., a touchscreen or tablet computer). The network interface 120 permits communication with other computing or storage devices, such as the data lake 140, remotely located from the system 110. The network interface 120 may also permit communication with various kinds of remote storage, such as cloud-based storage. Non-volatile storage 122 stores the operating system and programs, including computer-executable instructions for implementing the operating system and modules, as well as any data used by these services.

The data lake 140 stores data from one or more sources, such as databases, data warehouses, and data marts. The data lake 140 may be local (e.g., coupled to the system 110). In other embodiments, the data lake 140 may be remote (e.g., accessible via a network). Data from the data lake 140 may be transferred to non-volatile storage 122 prior to or during operation of the system 110. Similarly, data from non-volatile storage 122 may be transferred to the data lake 140. During operation of the system 110, the operating system, the modules, and the related data may be retrieved from the non-volatile storage 122 and placed in RAM 114 to facilitate execution. In some embodiments, the system 110 includes various conceptual modules including an indexing module 130, a search engine 132, a table-joining module 134, an input module 136, and an output module 138. As described herein, the indexing module 130 can build an inverted index and a dictionary from the data lake 140, the search engine 132 can search for overlaps between tables in the data lake 140, and the table-joining module 134 can join tables found in the data lake 140 that are deemed to have sufficient overlap.

In embodiments described herein, the system 110 can receive, as input, a table and a specified column from a user computing device communicating over the network interface 120. The system 110 can return tables that can be joined with the input table on the specified column. In some cases, the number of distinct values in the resulting join column can be used to measure relevance of the returned tables. This search can be expressed as a top-k set overlap search problem. In some cases, the system 110 takes all columns of all tables in a repository of tables, converts every column into a set of distinct values, and calls the collection of sets Ω. Let Q be the set of distinct values in the user specified column. The top-k set overlap search problem can be defined as follows. Given a set Q (the query), and a collection of sets Ω, find a sub-collection ω of at most k sets such that:

$$|Q \cap X| > 0, X \in \omega, \text{ and}$$

$$\min\{|Q \cap X|, X \in \omega\} \geq |Q \cap Y|, Y \notin \omega, Y \in \Omega$$

Where k is a received requested set quantity. It should be noted that the k-th (or the last) set in the result ranked by set overlap with the query has the same or larger overlap as any other set that is not in the result. As will be explained below, the k-th overlap value in the result can be used as a threshold to prune unseen sets.

In an approach for exact set similarity search, basic techniques from information retrieval can be utilized; for example, an inverted index. The inverted index can be used in search engines; for example, to locate documents and web pages. In the present embodiments, inverted indexes are used in the context of set overlap search. For a collection of sets $X_1, X_2, \ldots \in \Omega$, the indexing module 130 extracts tokens (i.e., values) $x_1, x_2, \ldots$ from all the sets. For each token, the indexing module 130 builds a posting list of pointers to the sets that contain the token, and these posting lists together form an inverted index. For example, the following three sets can be used to build an inverted index containing six posting lists.

$$\begin{aligned}
&X_1 = \{x_1, x_2, x_3\} \\
&X_2 = \{x_3, x_4, x_5\} \Rightarrow \\
&X_3 = \{x_2, x_4, x_6\}
\end{aligned}
\quad
\begin{aligned}
&x_1 : \{X_1\} \\
&x_2 : \{X_1, X_3\} \\
&x_3 : \{X_1, X_2\} \\
&x_4 : \{X_2, X_3\} \\
&x_5 : \{X_2\} \\
&x_6 : \{X_3\}
\end{aligned}$$

An inverted index over a massive collection of sets, with millions of tokens and millions of sets, is very large, so the posting lists may have to be stored on disk or distributed as scalability becomes an issue. A query set may contain tokens not in the inverted index, and generally this should be determined quickly. Thus, a data structure called a dictionary can be used that contains each token, its frequency, and a pointer to its posting list. An example dictionary for the three set example above and its index is given below in Table 1:

TABLE 1

| Token | Frequency | Posting List Pointer |
|---|---|---|
| $x_1$ | 1 | 1 |
| $x_2$ | 2 | 2 |
| $x_3$ | 2 | 3 |
| $x_4$ | 2 | 4 |
| $x_5$ | 1 | 5 |
| $x_6$ | 1 | 6 |

The dictionary can be encoded in any suitable format; for example, as a hash table, a search tree, or an array based on a sorted order of tokens, for efficient look-up when processing query tokens. Using the dictionary and inverted index, the MergeUst approach can be used for top-k set overlap search. First, MergeUst initializes a hash map to store the overlapping token counts of candidate sets. For every query token, it uses the dictionary to check if the token exists in the inverted index; if it exists, then it reads the entire posting list and increment counts for candidate sets in the list. Once all posting lists are read, MergeUst sorts the candidate sets by their overlapping token counts, then returns the k sets with the highest counts. This is akin to performing a list union query over the posting lists but also keeping track of occurrence counts. The total time (ignoring memory hierarchy concerns) is:

$$\text{Total Time} = \Sigma_{x_i \in Q \cap U} L(f_i) \quad (1)$$

where U is the set of all tokens in the dictionary, $f_i$ is the frequency of token $x_i$, and L(•) is the time to read a posting list as a function of the length of the list.

In an embodiment, candidate sets can be generated by having the pointers (or IDs) associated with the respective candidate sets stored in the posting lists. The candidate sets can be the candidates associated with the top-k results, which is a list of k sets. In most cases, MergeList generates the candidate sets by obtaining their pointers from the posting lists. In these cases, MergeList does not obtain the complete candidate sets, but rather their pointers. In most cases, MergeList can keep count of the number of times each pointer occurs in all the posting lists it reads.

MergeList's read time is generally linear to the number of matched tokens. Generally, this does not present a big issue when sets have less than a few hundred tokens; however, in the context of a joinable table search, the sets extracted from columns can easily have thousands or even millions of tokens. Thus, in the embodiments described herein, the number of posting lists read is reduced.

A prefix filter can be used to address a threshold version of the set similarity search problem, which can also be used to address the top-k problem. To explain the prefix filter, consider a threshold problem. Assuming an overlap threshold, t, is given, and all candidate sets with overlap greater than or equal to t must be returned. For simplicity, assume all tokens in the query Q found a match in the dictionary. The system 110 only needs to read posting lists for a subset (any subset will do) of Q with size $|Q|-t+1$. This is because for any candidate set X such that $|Q \cap X| \geq t$, the following holds: $|Q|-t+1 > |Q|-|Q \cap X|$.

So even if all the tokens not in the intersection between Q and X (the count of which is the right-hand side above) are selected as part of the subset, there will still be one token in the subset belonging to the intersection. A $|Q|-t+1$ subset of tokens is called a prefix of the query, and by reading the posting lists of a prefix, the system 110 can be effectively guaranteed to not miss any candidate set that meets the threshold t; in other words, those sets pass the filter created by the prefix. However, for every candidate set encountered in the posting lists read, the system 110 must compute their exact overlap to verify if they indeed meet the threshold.

The prefix filter can be used to address the top-k problem. Given an overlap threshold t, all candidate sets X such that $|Q \cap X| \geq t$ must be found in any subset (prefix) of posting lists given the subset's size is $|Q|-t+1$, and posting lists outside the subset are not required to be read.

In some approaches that use a top-k algorithm with a prefix filter, a fixed-size min-heap can be used to keep track of the running top-k candidate sets. This approach uses the running k-th candidate's overlap as the threshold: after finishing reading a posting list, the system 110 needs to check the overlap of the current k-th candidate $X_k$, $|Q \cap X_k|$, and if the number of lists already read so far is equal to $|Q|-|Q \cap X_k|+1$, then reading new lists is ceased and the current running top-k candidate sets are returned as the results.

Since $|Q \cap X_k|$ is the threshold, the first $|Q|-|Q \cap X_k|+1$ posting lists become the prefix. This approach, called ProbeSet, is different from MergeList (that reads only posting lists) because it probes candidate sets as it encounters them.

Compared to MergeList, ProbeSet offers the benefit of reading fewer posting lists, at the expense of probing some sets. However, the trade-off may fall out of favor with ProbeSet, because in the context of searching joinable tables, sets may be very large, potentially making reading sets more expensive than reading the skipped posting lists.

In most cases, ProbeSet reads and computes exact overlap for every new candidate set encountered. In some cases, an optimization technique, called position filter, can be used to prune out candidate sets whose overlaps are less than a threshold before reading them. ProbeSet typically uses a position filter.

Generally, there are two requirements to use a position filter. First, there should be a global ordering assigned (for example, lexicographic, length, or the like) for the universe of all tokens, and all sets (including the query set) should be sorted by the global ordering. Generally, the choice of ordering does not affect the applicability of the position filter; however, the ordering can affect performance. In some cases, the ordering assignment and sorting can be undertaken during the indexing phase prior to building posting lists. In some cases, the sorting of the query set can be undertaken while matching with the dictionary is undertaken. The second requirement is that each token's posting list should contain the positions of the token in the sets that contain it, as well as the sizes of the sets.

For a first example, an example of sets and posting lists is provided as follows:

$X_1 = \{x_1, x_{100}, x_{200}\}$  $x_1$ : $\{(X_1, 1, 3)\}$ $X_2 = \{x_2, x_5\}$  $x_2$ : $\{(X_2, 1, 2), (X_3, 1, 1),$ $X_3 = \{x_2\}$  $\Longrightarrow$  $(X_4, 1, 100)\}$ $X_4 = \{x_2, \ldots, x_{100}, x_{101}\}$  $x_{100}$ : $\{(X_1, 2, 3), (X_4, 99, 100)\}$ $x_{200}$ : $\{(X_1, 3, 3)\}$ In this example, in each entry of a posting list, the second integer is the position and the third integer is the size of the set. In this example, some posting lists are not shown for brevity and space saving.

The position filter can be applied to optimize ProbeSet. First, the system 110 sorts the query set according to the global token ordering, and reads the posting lists by the same ordering. When the system 110 encounters a new candidate set X from the posting list of token $x_i$ (i.e., the i-th token in the sorted query set), the system 110 can compute the upper-bound of its overlap with the query set Q using:

$$|Q \cap X| \leq |Q \cap X|_{ub} = 1 + \min(|Q|-i, |X|-j_{X,0}) \quad (2)$$

Where $j_{X,0}$ is the position of token $x_i$ in X, it is also the first overlapping token between Q and X, hence the 0 in the subscript. Since both Q and X are sorted using the same global ordering and the system 110 is seeing X for the first time, the system 110 can determine that there is no overlapping token between Q and X before this token at their i-th and $j_{X,0}$-th positions, respectively. So the upper-bound overlap is one plus the minimum of the number of remaining tokens in both sets. The threshold for the top-k search problem is the running k-th candidate's overlap, $|Q \cap X_k|$. If $|Q \cap X_{ub}| \leq |Q \cap X_k|$, the system 110 can skip X, and ignore it in future encounters.

Another substantial benefit of using the position filter is reducing the time required for reading individual candidate sets. Since there is no overlapping token between Q and X before their first matching positions, the system 110 only needs to read the suffix $X[j_{X,0}+1:]$ to determine the exact overlap.

For a second example, consider the posting lists from the first example and let the query set be $Q=\{x_1, x_2, x_{100}, x_{200}\}$ and k=2. The system 110 first reads the posting list of $x_1$, which leads to reading and computing the exact overlap for $X_1$, which is three. Then the system 110 reads the posting list of $x_2$. Since the heap is not full, the system 110 reads $X_2$, computes the exact overlap, and pushes $(X_2,1)$ to the heap. The running heap is $((X_1, 3), (X_2, 1))$ and the k-th candidate's overlap is one.

Now that the heap is full and there is a running top-k, the system 110 can use the position filter to check the next candidate set $X_3$. For $X_3$, because $|Q \cap X_3|_{ub}=1+\min(4-2, 1-1)=1 \leq 1$, it does not pass the position filter. So the system 110 skips $X_3$. For $X_4$, because $|Q \cap X_4|_{ub}=1+\min(4-2, 100-1)=100>1$, it passes the position filter. So the system 110 reads $X_4$, and determines the overlap, which is two. The system 110 pops $(X_2,1)$ from the heap and pushes $(X_4, 2)$ onto the heap, which becomes $((X_1, 3), (X_4, 2))$.

The system 110 continues to read the third posting list $x_{100}$, and can skip both $X_1$ and $X_4$ as they have been seen before. The prefix size is 4-2+1=3, thus $x_{100}$ is the last posting list. The system 110 skips $x_{200}$ and terminates the search.

In this example, a total read time of the optimized ProbeSet can be determined as:

$$\Sigma_{i=1}^{p^*} L(f_i) + \Sigma_{X \in W \setminus V} S(|X[j_{X,0}:]|) \quad (3)$$

The first summation term is the total time spent in reading posting lists of the prefix, where p* is the final prefix length and $p^*=|Q|-|Q \cap X_k^*|+1$, where $X_k^*$ is the final k-th candidate in the final result. The second summation term is the total time spent in reading all qualified candidates (W\V) encountered in the prefix, where W is the set of all candidates, and V is the set of candidates pruned by the position filter. The position $j_{X,0}$ is the first matching token position of X with Q. Lastly, $S(\bullet)$ is the time of reading a set as a function of its size.

ProbeSet takes advantage of the prefix filter to read fewer posting lists, but requires extra computational work, which is partially reduced by using a position filter, to verify the candidate sets by reading and computing exact overlaps. The above approach, however, generally does not employ a framework that quantifies benefits (for example, reduced computational cost) of reading posting lists and candidate sets.

Embodiments of the present invention provide a technological approach for optimizing the system's search for joinable tables in massive data lakes. In embodiments described herein, the search can be optimized by, for example, alternating and minimizing the number of sets read and the number of inverted index probes used in finding the top-k sets that join with a user's query. Advantageously, these embodiments outperform other overlap search approaches on data lakes. Further, as compared to other approximate set search approaches (for example, that use data sketches), these embodiments perform approximately as well, and in some cases better, on real data lakes.

The present embodiments provide systems, methods, and computer programs that, for example, utilize an approach for determining top-k joinable tables based on containment that scales to large sets and large dictionary sizes, such as in data lakes. Unlike other approaches that can be very sensitive to data characteristics (and hence may perform very differently on different data lakes), the embodiments described herein can be adaptive to various data distributions, and hence, have robust performance even on data lakes as diverse as Open Data and Web Tables.

In the embodiments described herein, the system 110 can carry out data preparation by finding relevant datasets within massive data lakes. In a particular case, the system 110 can search joinable tables using only data values. As an example, the system 110 receives a table $T_Q$ and specifies a column $C_Q$ as the join column from a user. In this case, the system 110 finds table $T_X$ with a column $C_X$, such that $T_Q$ can be equi-joined with $T_X$ by matching values exactly between $C_Q$ and $C_X$. Advantageously, in some cases, finding joinable tables can help data scientists discover useful tables that they may not know about and can lead to surprising new data science.

FIG. 2 illustrates an example input table 200. For the sake of simplicity, the input table 200 has a header row 205 and four data rows being: a first data row 210, a second data row 220, a third data row 230, and a fourth data row 240. The input table 200 has four columns containing data under the header row 205; the columns being: a first column 251, a second column 252, a third column 253, and a fourth column 254. In the input table 200, each of the four data rows provides a record with four tokens, also known as cells. For ease of readability, each token is labelled as 2RC, where 'R' is its row number and 'C' is its column number. For example, token 223 is the cell at second data row 220 and third column 253, in this table having the value "R0K0H0".

FIG. 3 illustrates an example candidate table 300. For the sake of simplicity, the candidate table 300 has a header row 305 and four data rows—first data row 310, second data row 320, third data row 330, and fourth data row 340. The candidate table 300 has four columns containing data under the header row 305—first column 351, second column 352, third column 353, and fourth column 354. In the candidate table 300, each of the four data rows provides a record with four tokens, also known as cells. For ease of readability, each token is labelled as 3RC, where 'R' is its row number and 'C' is its column number. For example, token 323 is the cell at second data row 320 and third column 353, in this table having the value "Conservative".

FIGS. 2 and 3 show an example of joinable tables, obtained from Canadian Open Data. The input table 200 has data on the air pollutant emissions of industrial facilities in Canada. In the input table 200, the header row 205 identifies the third column 253 as the "Postal" column. The candidate table 300 has data on political campaign contributions. In the candidate table 300, the header row 305 identifies the second column 352 as the "Postal Code" column. Second column ("Postal Code") has values exactly matching the ones in third column 253 ("Postal"). By joining these two tables, the system 110 can, for example, generate analytics on pollution and political orientation.

Some approaches on finding joinable tables can use a batch approach to find all pairs of joinable tables in a data lake in batch. These approaches can speed up the look-up time but generally come at a cost of recomputing pairs when data changes, and not allowing input tables outside of the same data lakes. Embodiments described herein advantageously allow users or administrators, or their respective computing devices, to provide their own input table. In this way, indexed tables can be changed or added without additional recomputation of pairs.

Furthermore, some approaches focus on finding inclusion dependencies, which requires $C_Q \subseteq C_X$. However, with data lakes, due to tables possibly originating from different sources, this constraint may be too strict. In the present embodiments, tables that can join with a large portion of the input table can be used, with join operations that are not limited to those between foreign key and key columns.

Embodiments described herein advantageously provide set overlap searching using joinable tables for large datasets, such as a data lake. For example, given $T_Q$ and $C_Q$, the system 110 can find a ranked list of $C_X$ and $T_X$. The technical problem can be formulated as a set overlap search problem by considering columns as sets, and joinable values as overlap between sets. The system 110 can consider set overlap between $C_Q$ and $C_X$ a good measure for ranking joinable tables because it indicates how many rows (distinct by $C_Q$) on $T_Q$ can be joined with $T_X$. It is also immune to data value skew in Co and aggregation operations that may be needed before or after performing the join, such as the candidate table (for example, shown in FIG. 3).

Generally, set overlap search is an instance of set similarity search approaches. While set similarity search approaches generally focus on relatively small sets such as keywords and titles, other approaches that use inverted indexes can use larger sets. Inverted indexes generally contain posting lists that map every, or most, distinct values in a set (or token) to a list of indexed sets that contain it. These approaches generally involve either (1) reading all posting lists in the query set to find candidate sets, and then ranking them based on the number of times they appear; or (2) reading a subset of posting lists to locate candidate sets, and then reading the candidate sets to find the final ranked list of sets. Most of these approaches assume the inverted index is relatively small.

The characteristics of modern data lakes create unique challenges. Data lakes may have large set sizes and huge dictionaries (number of distinct values); which have significant implications. Due to the huge number of unique tokens, an inverted index will use a lot of space (for example, approximately 100 GB in PostgreSQL). Thus, memory management becomes an issue for the index, and reading the whole index (all posting lists) becomes infeasible. Additionally, sets are also large so memory management again is an issue; and thus, there is a need to limit the number of sets read. Consequently, the cost of reading a posting list or a set in data lakes will generally be more expensive than with smaller set sizes (and fewer unique values), and an approach that reads all the posting lists of a large query set, or reads too many candidate sets, is generally not be feasible.

Some approaches to set similarity search generally focus on a version that involves a threshold: given a set similarity function that takes two sets as input and outputs a score, for a query set, find all sets whose scores, computed with the query set, meet a user-specified threshold. Set overlap can be defined as a similarity function that outputs the set intersection size. However, for the problem of searching data lakes, finding a threshold may be very difficult and asking a user for a threshold may confuse the user, who have no knowledge of what data exists in the lake and therefore do not know what is a good threshold that will retrieve some, but not too many answers. Also, a threshold that is too low may severely delay response time as there are too many results to process.

An alternative approach is a top-k search that finds the best k sets that have the highest overlaps. The system or user do not need any prior knowledge to specify k. For example, a small value (e.g., 10) may be sufficient to get an understanding of what is available in the data lake.

The above approaches are generally directed to exact solutions to set overlap search. There are also approximate approaches that are scalable in performance. However, such approaches tend to suffer from false positive and negative errors, especially when the distribution of set sizes is skewed; for example, following a Zipfian distribution. Embodiments described herein advantageously provide an exact approach that can have just as good performance.

The embodiments described herein advantageously provide: a set overlap search approach that can be used to determine exact top-k joinable tables based on containment that scales to large sets and large dictionary sizes (including data lakes); a scalable algorithm for building the search index; and a strategy for incremental updates.

As described herein, example experiments conducted by the present inventors illustrate that examples of the present embodiments out-perform other approaches in query time by a factor of at least two, with three-times less standard deviation, on two real-world data lakes: Government Open Data and Web Tables. The results show that the present embodiments are adaptive to data distribution, and hence have robust performance even on data lakes as diverse as Open Data and Web Tables. This is unlike other approaches that are very sensitive to data characteristics, and hence perform very differently on different data lakes. The example experiments show that the present embodiments, for reasonable k, out-perform other approximate approaches, which uses approximate data sketches for sets, for query sizes up to 10K. This experimental comparison of exact approaches is generally the first to consider queries of this size; being able to beat approximate approaches is a dramatic improvement in the field. Also, the results of the example experiments examine massive queries up to 100K values and show competitiveness with approximate techniques for small k. For larger k, performance may be 3 to 4 times slower than the approximate search method (in this example, meaning 6-8 seconds instead of 1 or 2), but this extra time provides exact results as opposed to the approximate technique missing 10% to 40% of the answers.

Figure 4:
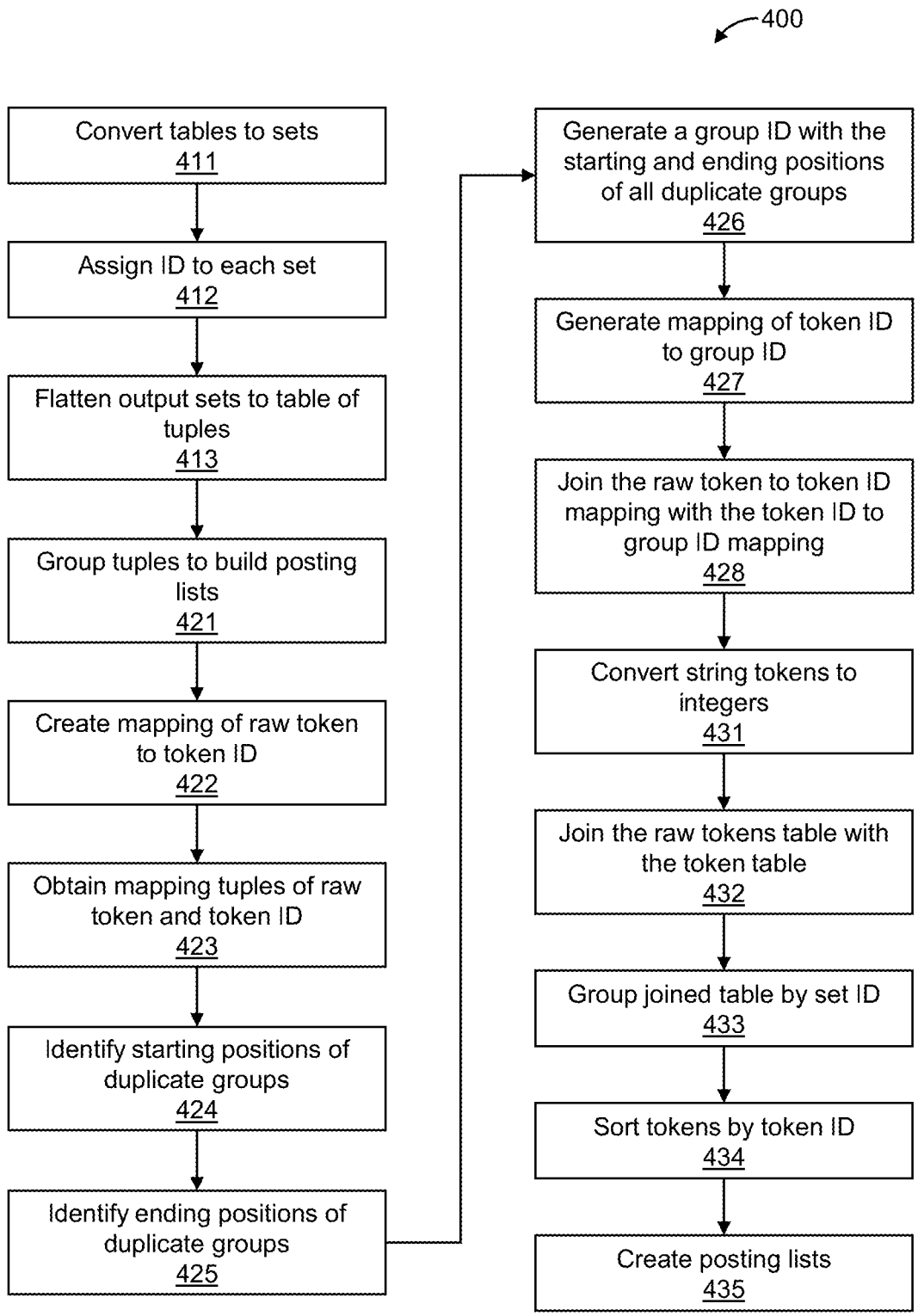
FIG. 4 is a diagrammatic flow diagram of a method of indexing data lakes, according to an embodiment.

FIG. 4 illustrates a method of indexing data lakes 400, according to an embodiment. In method 400, the system 110 receives data from the data lake 140 and builds an inverted index and a dictionary therefrom.

In an embodiment, method 400 includes three overarching progressions: (a) extracting raw tokens (or data values), (b) building a token table, and (c) converting string tokens to integers. Blocks 411 to 413 involve extracting the raw tokens. Blocks 421 to 426 involve building the token table. Blocks 431 to 433 involve converting the string tokens to integers. In further embodiments, not all the above may be required to index a data lake; for example, converting string tokens to integers may not be needed if all raw tokens are integers.

At block 411, the indexing module 130 converts tables in the data lake into a collection of sets. For each table, the indexing module 130 performs the conversion by, for each set, selecting distinct values (i.e., tokens) from a column of the table.

The indexing module 130 takes in the tables that are to be indexed and made searchable, where each table is a collection of columns. In most cases, each column that needs to be made searchable is extracted as a list of data values. The list of data values from each column can then converted by the indexing module 130 to a set of distinct data values by deduplication.

At block 412, the indexing module 130 assigns to each set a 'SetID', a unique integer identifier used to resolve the original table from which the set is extracted.

During the process of extracting sets from tables, the indexing module 130 can create a one-to-one mapping. This mapping maps table-column references (i.e., the storage location in the data lake, access path, and the like) to a unique integer, SetID; In some cases, the indexing module 130 also maps the reverse direction of the SetID to the table-column reference. Thus, given a particular SetID, the search engine 132 can determine the table-column reference and thus locate the table in the data lake.

At block 413, the indexing module 130 flattens the output sets into a derivative table that includes 'RawTokens' of tuples (RawToken, SetID). Each tuple represents an occurrence of a string token in a set.

The indexing module 130 builds a token table called 'TokenTable'. In an embodiment, the TokenTable maps distinct raw string tokens (RawTokens) to a unique integer ID ('TokenID'), which indicates the token's position in the global order, and an integer duplicate group ID ('GroupID'). Each tuple of the table becomes (RawToken, TokenID, GroupID). TokenTable can then be used as the dictionary for query processing.

A GroupID can be used to reference a group of duplicate posting lists, whereby posting lists in a given group are identical. The posting list itself can be used to map TokenIDs to a list of SetIDs.

In an embodiment, the indexing module 130 can group tuples In this case, "RawTokens" is a table, and "RawToken" is a field in that table. When grouping the RawTokens table by the field RawToken, the indexing module 130 can create, for every distinct "RawToken" value, a list of tuples having that RawToken value. The following is an example of such a grouping:

| (1, Eric) | | |
|---|---|---|
| (2, Eric) | | Eric: {(1, Eric), (2, Eric)} |
| (3, Joe) | ⇒ | Joe: {(3, Joe)} |
| (4, Jack) | | Jack: {(4, Jack)} |

In the above example, the tuples consist of a PersonID and a FirstName. For example, the first tuple has a PersonID of '1' and a FirstName of "Eric". The indexing module 130 groups the table by the field FirstName such that for every RawToken value, there is a list of SetID values (a posting list).

At block 421, the indexing module 130 groups tuples in the RawTokens table by RawToken to build posting lists of sorted SetID.

The indexing module 130 can then create a mapping of RawToken to TokenID. At block 422, the indexing module 130 sorts posting lists by length (for example, using token frequency, as frequency order can be used as the global order), then by their hash values, and then by the lists themselves. In further cases, other sorting approaches and orders can be used. In a particular case, the hash values are MurmurHash3 values. The use of MurmurHash3 values can advantageously help avoid most of the expensive pair-wise comparisons of same-length posting lists that do not have a hash collision.

At block 423, the indexing module 130 obtains the mapping tuples (RawToken, TokenID) using the sorted position of each posting list as the TokenID of the corresponding RawToken. In this case, frequency order is used as the global order, which can be advantageously used to leverage distinct list optimization. In other embodiments, another global order, for example, the original positions of posting lists before sorting, can be used.

At blocks 424 and 425, the indexing module 130 identifies starting positions and ending positions to create duplicate groups. In a particular case, each duplicate group can span a consecutive interval in the global order by frequency.

In a particular case, having duplicate groups advantageously provides computing efficiency because it allows the system 100 to read at most one posting list from each group, instead of reading all the posting lists that are duplicates, during the execution of a set overlap search. Because all posting lists in a duplicate group contain the same SetIDs, reading more than one posting list from the group would generally be inefficient and wasteful of resources.

At block 424, the indexing module 130 identifies the starting positions of duplicate groups by comparing pairs of adjacent posting lists (lower and upper) in the global order. For a pair, if the lower and upper posting lists are different, then the upper posting list's TokenID can be assigned the starting position of a new duplicate group. In a particular case, the first duplicate group's starting position is 0, which is prepended to the list of results.

At block 425, the indexing module 130 obtains the ending positions of duplicate groups by scanning pairs of adjacent groups' starting positions. The indexing module 130 then takes the upper group's starting position as the ending position of the lower duplicate group. In this way, the indexing module 130 can store the starting and ending positions of the duplicate groups.

At block 426, the indexing module 130 generates the GroupID for each of the duplicate groups as the starting and ending positions of such duplicate group.

At block 427, the indexing module 130 generates the mapping (TokenID, GroupID) by ranging from the starting until the ending position for each group.

At block 428, the indexing module 130 joins the two mappings, (RawToken, TokenID) and (TokenID, GroupID), to obtain TokenTable.

The string tokens can be converted to integers, if necessary, using TokenID. Integers can be used instead of string tokens because it is faster to computer intersections on integer sets than on string sets. As well, a number of storage systems, for example Postgres, can handle integer sets efficiently. Also, advantageously, using integer sets allows for better estimation of read costs.

At block 431, in some cases, the indexing module 130 converts the string tokens to integers. At block 432, the indexing module 130 joins the RawTokens table with TokenTable. At block 433, the indexing module 130 groups the resultant joined table by SetID to get sets while selecting only TokenID and GroupID. At block 434, the indexing module 130 sorts tokens in each set by TokenID to reflect the global order. At block 435, the indexing module 130 creates the posting lists from the integer sets. Once the posting lists are created, the indexing module 130 can output the posting lists and/or the inverted index.

In a particular case, the posting lists contain the positions of the tokens in the sets that contain it, as well as the sizes of the sets. In an example, for each entry of a posting list, the second integer can be the position and the third integer can be the size of the set (as shown in the first example above).

For purposes of illustration, the method of indexing data lakes 400 can be implemented using the following example procedure:

```
1:  procedure INDEXING(RawTokens)
2:      R ← A map from RawToken to a list of unique SetID
3:      for (RawToken, SetID) ∈ RawTokens do
4:          R[RawToken]. add (SetID)
5:      end for
6:      M ← SORTMAP(R, LESS)  ▷Sort all posting lists using a comparator function LESS,
            output a list of (RawToken, SetIDs)
7:      L,U ← {1}, { } ▷ Lower and upper bound indexes of duplicate groups
8:      for i ← 1. . . LENGTH(M) – 1 do
9:          if M[i] ≠ M[i + 1] then▷ Adjacent posting lists
10:             U. append(i)
11:             L. append(i + 1)
12:         end if
13:     end for
14:     U. append (LENGTH(M))
15:     G ← A map from TokenID to GroupID
16:     for GroupID ← 1. . . LENGTH(L) do
17:         for TokenID ← L[GroupID]. . . U[GroupID] do
18:             G[TokenID] ← GroupID
19:         end for
20:     end for
21:     D ← A map from RawToken to (TokenID, GroupID)
22:     for TokenID ← 1. . . LENGTH(M) do
23:         RawToken, SetIDs ← M[TokenID]
24:         GroupID ← G[TokenID]
25:         D[RawToken] ← (TokenID, GroupID)
26:     end for
27:     S ← A map from SetID to a list of unique TokenID
28:     for (RawToken, SetID) ∈ RawTokens do
29:         TokenID, GroupID ← D[RawToken]
30:         S[SetID].add (TokenID)
31:     end for
32:     P ← A map from integer TokenID to a list of tuples (SetID, Position, Size)
33:     for SetID ∈ S do
34:         S[SetID] ← SORT(S[SetID])
35:         for i ← 1. . . LENGTH(S[SetID]) do
36:             P[TokenID]. add ((SetID, i, LENGTH(S[SetID])))
```

```
37:        end for
38:     end for
39:     return D, S, P ▷Dictionary, integer sets, posting lists
40: end procedure
```

For the purposes of illustration, the comparator function LESS can be implemented using the following example procedure:

```
1:   procedure LESS(p₁, p₂) ▷ Returns true if p₁ less than p₂
2:      if LENGTH(p₁) < LENGTH(p₂) then
3:         return true
4:      else if LENGTH(p₁) > LENGTH(p₂) then
5:         return false
6:      end if
7:      h₁, h₂ ← MURMURHASH3 (p₁), MURMURHASH3(p₂)
8:      if h₁ < h₂ then
9:         return true
10:     else if h₁ > h₂ then
11:        return false
12:     end if
13:     for i ← 1 . . . LENGTH(p₁) do
14:        if p₁[i] < p₂ [i] then
15:           return true
16:        end if
17:     end for
18:     return false
19:  end procedure
```

In an embodiment, the indexing module 130 can incrementally update posting lists and integer sets in the inverted index. If the indexing module 130 does so while maintaining the global order of tokens, it can advantageously improve the efficiency of a set overlap search that it can optimally choose when to read lists and when to read sets based on the estimated benefit of each (as described below in, for example, method 700).

Any update to the index, such as addition of a new set, addition of a new token, or removal of an existing token, in an embodiment, can be expressed as a sequence of ADD and DELETE operations of (RawToken, SetID) tuples. In this embodiment, for ADD, there can be 4 different cases: (1) RawToken and SetID both exist; (2) RawToken exists, and SetID is new; (3) RawToken is new, and SetID exists; and (4) RawToken and SetID are both new.

In the first case, RawToken and SetID both exist. This requires no action because, in this case, a set consists of unique tokens.

In the second case, RawToken exists, and SetID is new. The indexing module 130 creates a new integer set using the existing TokenID, obtained from the dictionary given the RawToken. For the posting list of TokenID, the indexing module 130 appends a new entry (SetID, 0, 1), as the new set has only one token. The duplicate group ID of this posting list is invalidated due to the append. The global order is unchanged in this case.

In the third case, RawToken is new, and SetID exists. Because the token is not in the index, the indexing module 130 assigns a new integer TokenID by incrementing the maximum existing TokenID, effectively expanding the global order by one and keeping the existing positions unchanged. Because the new token is at the end of the global order, the indexing module 130 appends its new TokenID to the end of the existing set given by the SetID. For existing posting lists of the set, the indexing module 130 updates the set's entry by incrementing the size: (SetID, *, size+1). Because the new token is appended, the existing tokens' positions are unchanged. Lastly, the indexing module 130 creates a new posting list for the new token with the entry (SetID, size, size+1).

In the fourth case, RawToken and SetID are both new. This can be considered a combination of the previous two cases. The indexing module 130 first assigns a new TokenID to the RawToken, then creates a new integer set, and lastly creates a new posting list with entry (SetID, 0, 1). The global order of tokens is expanded by one, but the rest is unchanged.

This incremental update strategy can also be applied directly to an empty index. The resulting global order would be the order in which tokens are added.

For the DELETE operation, the indexing module 130 first removes the entry from the posting list corresponding to RawToken, and updates the entries in other posting lists of the tokens in the set: some positions need to be shifted by one, and the sizes are decremented by one. Then the indexing module 130 also removes the token from the integer set.

Using incremental updates, the global order of existing tokens can be maintained in the posting lists and integer sets, which can advantageously improve the efficiency of a set overlap search. In this embodiment, the indexing module 130 does not assign duplicate group IDs for the newly added posting lists as well as those with append or removal, because finding the duplicate groups requires sorting all posting lists. Thus, the indexing module 130 does not skip the new and changed posting lists even if they are duplicates. This only affects the query performance, and since the tables in data lakes are often used for analytics tasks, updates are rare. The index can be used to keep track of the number of posting lists affected and statistics on query runtimes; advantageously, this can allow an appropriate time to rebuild the index for better performance to be selected.

In an embodiment, the indexing module 130 can take advantage of parallel query processing. The indexing module 130 can scale out the index by randomly partitioning the sets into m partitions. Then, the indexing module 130 can build a TokenTable, integer sets, and posting lists on each partition. Query processing is distributed across all the partitions, and the top-k results from all the partitions are merged to obtain the global top-k. Within each partition, the indexing module 130 can utilize multi-core platforms to read and process postings lists in parallel.

Once an inverted index is created, a search engine can employ a framework that quantifies the benefits (for example, reduced cost) of reading posting lists and candidate sets. As a third example, building on the second example described above, suppose after reading posting list $x_2$, instead of reading $X_2$ before $X_3$ and $X_4$, the system 110 reads $X_4$ first. The running heap after reading $X_4$ is (($X_1$, 3), ($X_4$, 2)), and by using a position filter, $|Q \cap X_2|_{ub}=1+\min(4-2, 2-1)=2 \leq 2$, and $|Q \cap X_3|_{ub}=1+\min(4-2,1-1)=1<2$, the system 110 can skip both $X_2$ and $X_3$ before terminating.

In the third example, the system 110 reads two sets, $X_1$ and $X_4$, compared to three sets in the second example. Advantageously, the system 110 does not have to read a candidate set immediately after the system 110 encounters it.

By prioritizing reading some candidate sets before the others, the system 110 can "lift" the running k-th candidate's overlap higher, increasing the pruning power of the position filter, and read fewer candidate sets.

Figure 5:
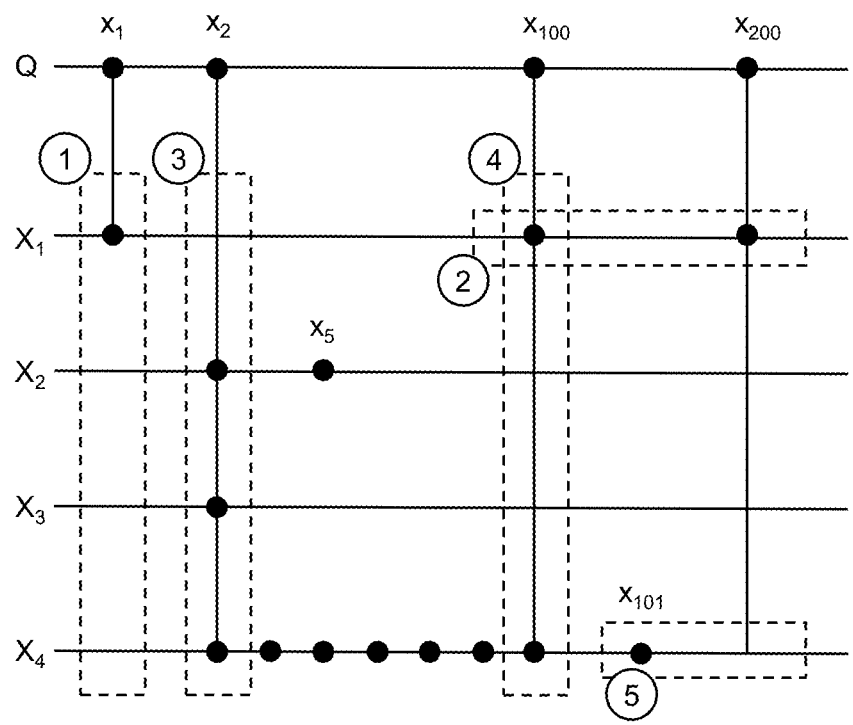
FIG. 5 illustrates a diagrammatic example read sequence for posting lists and candidate sets.

FIG. 5 illustrates an exemplary read sequence 500 that alternates between reading posting lists and candidate sets, according to an embodiment. In this fourth example, each set is a horizontal line, and each posting list is a vertical line, which connects common tokens among sets. For this fourth example, suppose the system 110 makes a different change after reading posting list $x_2$: instead of reading any sets, the system 110 continues to read posting list $x_{100}$. The posting list $x_{100}$ does not give any new candidates; both $X_1$ and $X_4$ are seen. However, the new position information allows the system 110 to update the position filters for the seen candidates. For $X_4$, its last token the system 110 saw before $x_{100}$ was $x_2$, thus no overlapping tokens between $x_2$ (position 1) and $x_{100}$ (position 99), and the only possible overlapping tokens exist in the remaining 100-99=1 token after $x_{100}$. Using this new information, the position filter of $X_4$ becomes $|Q \cap X_4|_{ub}=1+1+\min(4-3,100-99)=3$, and, the system 110 only needs to read the last token from $X_4$ to compute its exact overlap (not the whole set). The rest of this approach can be performed similarly to that of the third example; such that the system 110 can safely ignore $X_2$ and $X_3$ using position filters, and terminate. The complete read sequence for the fourth example is shown in FIG. 5.

In the fourth example, the system 110 reads in a total of three tokens from candidate sets, as shown in FIG. 1: 2 from $X_1$ and 1 from $X_4$. While in the second example, the system 110 reads 2+1+99=102 tokens, and in the third example, the system 110 reads 2+99=101 tokens. The system 110 thus does not need to read all candidates before reading the next posting list; as long as the system 110 returns to the candidates (when necessary) before terminating the search, the system 110 is still generally guaranteed to find the exact top-k. Additionally, as FIG. 5 shows, reading a posting list (e.g., $x_{100}$) has the benefit of potentially improving the position filters of unread candidates, in addition to reducing the amount of data (i.e., number of tokens) the system 110 has to read from candidates to compute exact overlaps.

Thus, advantageously, reading a candidate set and reading a posting list each have benefits in terms of reducing the time spent in reading other posting lists or candidates. In particular, reading a posting list can improve the position filters of unread candidates because it uncovers more "positions" in the unread candidates, and thus the candidates' remaining unknown "positions" are reduced.

Figure 6:
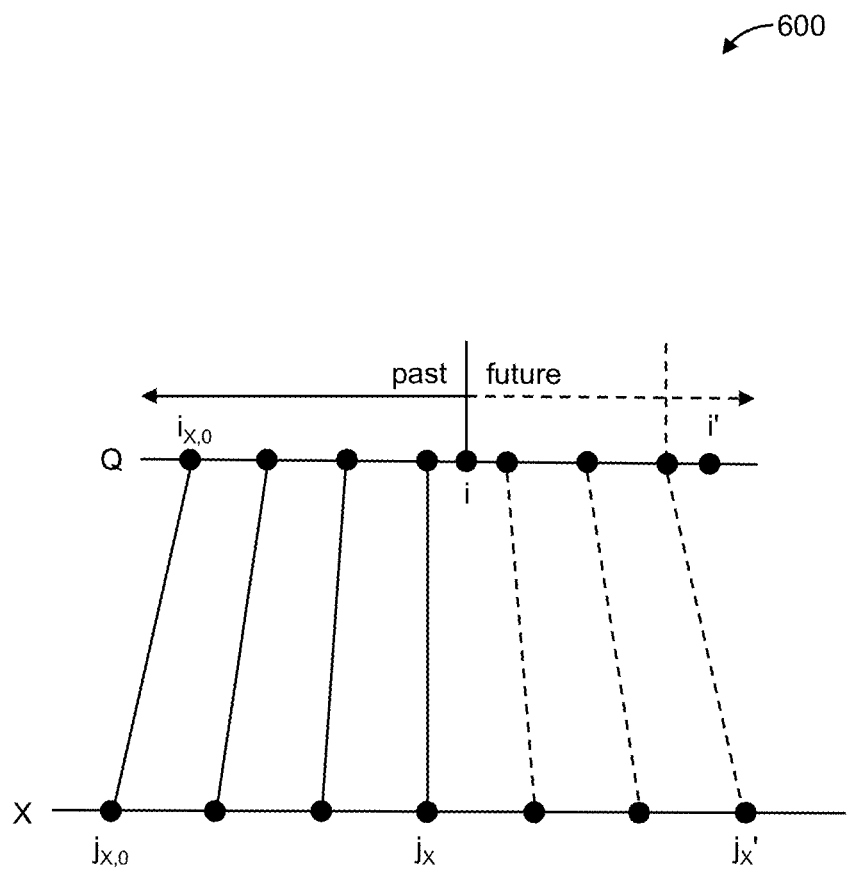
FIG. 6 illustrates a diagrammatic example of overlapping tokens between a query set and a candidate set.

FIG. 6 illustrates an example of overlapping tokens 600 between a query set Q and a candidate set X, after reading the posting list at position i, according an embodiment. Pairs of dots with solid lines represent overlapping tokens, pairs with dotted lines represent future overlapping tokens, and non-overlapping tokens in both sets are not shown. As explained herein, a potential benefit of reading a candidate set is to increase the overlap of the running k-th candidate (i.e., increase $|Q \cap X_k|$) which is used by both the prefix filter and position filter. The prefix filter generally prunes out posting lists (those beyond the prefix) and all unseen candidate sets in these lists. On the other hand, the position filter prunes out seen candidate sets by comparing the upper-bound overlap of a candidate set with threshold $|Q \cap X_k|$.

The system 110 can determine whether a candidate set can make it into the running top-k and increase the threshold $|Q \cap X_k|$. If X is a current candidate set, the system 110 typically has to determine whether or not to read it. In some cases, the system 110 may not have full information about all the tokens in X, however, the system 110 generally knows the following:

$i_{X,0}$ is the position in Q of the first token that overlaps with X, where X first appears in the posting list of that token;

$j_{X,0}$ is the position in X of the first token that overlaps with the query;

$j_X$ is the position in X of the most recent token that overlaps with the query; and $|Q[1:i] \cap X|$ is the number of overlapping tokens between Q and X up to and including the token at the current position i in Q, where Q[1: i] is the prefix of Q up and including token $x_i$: $x_1, x_2, \ldots, x_i$.

Both $j_X$ and $|X|$ can be found in the posting list entry of X. The posting lists of Q's tokens can be read from left to right according to the global token order, while keeping track of $i_{X,0}, j_X, |Q[1:i] \cap X|$ and $|X|$ for all seen candidates. In many cases, the system 110 generally does not have to read every candidate as it encounters it, as long as it is read or pruned prior to terminating.

Given this information about X, the system 110 can estimate its overlap $|Q \cap X|$, which, together with the running top-k heap, can be used to approximate the new threshold $|Q \cap X_k|$.

The set $Q \cap X$ in some cases can be considered as a subset of $Q[i_{X,0}:]$, the subset of Q starting from the first matching token with X. Also, the members of $Q \cap X$ can be assumed to be uniformly distributed over $Q[i_{X,0}:]$. The system 110 can determine an unbiased estimator for $|Q \cap X|$ as:

$$|Q \cap X|_{est} = \frac{|Q[i_{X,0}:i] \cap X|}{i - i_{X,0} + 1} \times (|Q| - i_{X,0} + 1) \quad (4)$$

$$= \frac{|Q[1:i] \cap X| - |Q[1:i_{X,0}] \cap X|}{i - i_{X,0} + 1} \times (|Q| - i_{X,0} + 1)$$

$$\frac{|Q[1:i] \cap X|}{i - i_{X,0} + 1} \times (|Q| - i_{X,0} + 1)$$

In some cases, this estimator can be most useful when considering $Q[i_{X,0}: i]$ as a random sample of $Q[i_{X,0}:]$. If the sample $Q[i_{X,0}: i]$ is small, the variance will be high. Therefore, the system 110 can read a couple (for example, ten) posting lists, starting from position $i_{X,0}$, before using this estimation.

Using $|Q \cap X|_{est}$, the system 110 can estimate a new threshold $|Q \cap X_k'|$, where $X_k'$ is the new k-th candidate after reading X. The system 110 first compares $|Q \cap X|_{est}$ with the current threshold $|Q \cap X_k|$. If $|Q \cap X|_{est} \leq |Q \cap X_k|$, then the system 110 can proceed as if to assume that the candidate set X likely will not qualify for the running top-k, thus leaving the current threshold unchanged. If $|Q \cap X|_{est} > |Q \cap X_k|$, the system 110 determines a new threshold after pushing X to the heap (and popping $X_k$), by comparing $|Q \cap X|_{est}$ with $|Q \cap X_{k-1}|$, where $X_{k-1}$ is the (k-1)-th candidate (done in constant time with a binary heap). The estimation can be summarized using Equation (5) as follows:

$$|Q \cap X_k'|_{est} = \begin{cases} |Q \cap X_k| & \text{if } |Q \cap X|_{est} \leq |Q \cap X_k| \\ |Q \cap X|_{est} & \text{if } |Q \cap X|_{est} > |Q \cap X_k| \\ & \text{and } |Q \cap X|_{est} \leq |Q \cap X_{k-1}| \\ |Q \cap X_{k-1}| & \text{if } |Q \cap X|_{est} > |Q \cap X_{k-1}| \end{cases} \quad (5)$$

Using the new threshold, the system 110 can estimate a benefit of reading candidate X, for example, in terms of time saved. A first benefit can be derived from eliminated posting lists using the prefix filter update. If the current prefix length is $p=|Q|-|Q \cap X_k|+1$, and the new prefix length after reading X is $p'=|Q|-|Q \cap X_k'|_{est}+1$, then the posting lists from $p'+1$ to $p$ inclusive can be eliminated, and the benefit is equal to the sum of the time to read these posting lists.

A second benefit can be derived from eliminating candidate sets by updating a position filter. For example, the position filter for a candidate set Y has an upper-bound overlap as follows:

$$|Q \cap Y|_{ub} = |Q[1:i] \cap Y| + \min(|Q|-i, |Y|-j_Y) \quad (6)$$

This is different from Equation (2) because the first term on the right is the number of overlapping tokens seen so far, as the system 110 does not read Y immediately after encountering it; this number may no longer be one. If $|Q \cap Y| \leq |Q \cap X_k'|_{est}$, then candidate Y will likely be eliminated after reading X. Thus, using the updated position filter, the system 110 can determine whether a candidate will be eliminated. Thus, the benefit can be the sum of the time it would take to read the eliminated candidates.

The system 110 can determine a benefit of reading candidate set X as follows:

$$\text{Benefit}(X) = \quad (7)$$
$$\sum_{i=p'+1}^{p} L(f_i) + \sum_{Y \in W_i, Y \neq X} S(|Y[j_Y+1:]|) \cdot I(|Q \cap Y|_{ub} \leq |Q \cap X_k'|_{est})$$

Where the set $W_i$ is all unread candidates at posting list i and $I(\bullet)$ is an indicator function that evaluates to one only if the condition argument is true, and zero otherwise.

The embodiments described herein can also be used to estimate the benefit of reading posting lists.

Let i be the position of the current posting list that was just read. In some cases, in order to avoid a large variance in estimating overlap, the system 110 can initially read a few posting lists for each candidate. The system 110 can read posting lists in "batch", and use i' to indicate the position of the end, or the last posting list, of the next batch. This is illustrated in the example of FIG. 6, which also shows the overlapping tokens between query Q and a candidate set X. Where $j_X$ be the most recent position in X whose token overlaps with Q, and $j_X'$ be the position in the future after reading the next batch of posting lists ending at i'.

Reading the next batch can improve (or at worse leave unchanged) the pruning power of the position filter by tightening the upper-bound for all, or most, candidates. Reading the next batch verifies the exact overlap in that batch, and "exposes" the number of tokens that do not overlap but have taken as part of the upper-bound. So the total number of tokens that count toward the upper-bound is reduced, and the upper-bound is lowered.

The future upper-bound overlap for candidate X at i' can be derived as follows:

$$|Q \cap X|_{ub'} = |Q[1:i'] \cap X| + \min(|Q|-i', |X|-j_X') \quad (15)$$
$$= |Q[1:i] \cap X| + |Q[i+1:i'] \cap X| + \min(|Q|-i', |X|-j_X')$$
$$\leq |Q[1:i] \cap X| + |Q[i+1:i']| + \min(|Q|-i', |X|-j_X')$$

$$\leq |Q[1:i] \cap X| + \min(|Q|-i, |X|-j_X)$$
$$= |Q \cap X|_{ub}$$

Intuitively, reading the next batch verifies the exact overlap in that batch, and "exposes" the number of tokens that do not overlap but have taken as part of the upper-bound. So the total number of tokens that count toward the upper-bound is reduced, and the upper-bound is lowered.

Given the new upper-bound $|Q \cap X|_{ub}'$, by comparing it with the current k-th candidate's overlap, or the current threshold, $|Q \cap X_k|$, the system 110 can determine, for every candidate X, whether it would be eliminated or not. If not, there may still be some benefit because it is now known that only the tokens in $X[j_X'+1:]$ need to be read.

The system 110 can then estimate $|Q \cap X|_{ub}'$. Estimating $|Q \cap X|_{ub}'$ can require, for example, $|Q[i+1: i'] \cap X|$, the number of overlapping tokens between Q and X in the next batch, and $j_X'$, the future position of the last overlapping token.

A determination of $|Q[i+1: i'] \cap X|$ can be estimated using the same approach used for the total overlap, $|Q \cap X|$, in Equation (4), by assuming uniform distribution of overlapping tokens over the range $Q[i_{X,0}:]$. This estimate can be as follows:

$$|Q[i+1:i'] \cap X|_{est} = \frac{|Q[i_{X,0}:i] \cap X|}{|Q|-i_{X,0}+1} \cdot (i'-i) \quad (8)$$

Since $i_{X,0}$ and $|Q[i_{X,0}:i] \cap X|$ are known for every candidate X, the estimate can be determined.

A determination of $j_X'$ can be estimated by first leveraging the fact that the number of overlapping tokens between i+1 and i' in Q are generally equal to that between $j_X+1$ and $j_X'$ in X, as shown in FIG. 6. The same estimation approach for overlap in Equation (8) can be used to create an approximate equality, from which an expression for $j_{X,est}'$ can be derived. This derivation is as follows:

$$|Q[i+1:i'] \cap X|_{est} \approx |Q \cap X[j_X+1:j_X']|_{est} \quad (9)$$
$$\frac{|Q[i_{X,0}:i] \cap X|}{|Q|-i_{X,0}+1} \cdot (i'-i) \approx \frac{|Q \cap X[j_{X,0}:j_X]|}{|X|-j_{X,0}+1} \cdot (j_X'-j_X)$$
$$j_{X,est}' = j_X + \frac{i'-i}{|Q|-i_{X,0}+1} \cdot (|X|-j_{X,0}+1)$$

In the above derivation, since $|Q[i_{X,0}: i] \cap X|$ is exactly the same as $|Q \cap X[j_{X,0}:j_X]|$ (see FIG. 6), they can be cancelled out on both sides of the equation.

Substituting $|Q[i+1: i'] \cap X|_{est}$ and $j_{X,est}'$ for $|Q[i+1: i'] \cap X|$ and $j_X'$, respectively, in Equation (9), the estimation for the future upper-bound of X in the position filter cam be determined as follows:

$$|Q \cap X|_{ub,est}' = |Q[1:i] \cap X| + |Q[i+1:i'] \cap X|_{est} + \min(|Q|-i', |X|-j_{X,est}') \quad (10)$$

With the estimation for the upper-bound, the system 110 can determine a summary of the benefit of reading the next batch of posting lists for tokens $B_{i+1, i'} = x_{i+1}, \ldots, x_{i'}$, as follows:

$$\text{Benefit}(B_{i+1,i'}) = \sum_{X \in W_i} S(|X[j_X:]|) \cdot I(|Q \cap X|'_{ub,est} \leq |Q \cap X_k|) + \quad (11)$$

$$(S(|X[j_X:]|) - S(|X[j_{X'}:]|)) \cdot I(|Q \cap X|'_{ub,est} > |Q \cap X_k|)$$

The first term is the time spent on reading candidate X, corresponding to the cost saved due to the elimination of X by reading the next batch of posting lists. The second term is the reduction in read time for reading X when it is not eliminated, but due to an updated position filter, fewer of its tokens need to be read. Similar to Equation (7), I(•) is an indicator function. In most cases, the benefit of reading posting lists is non-negative.

Given the quantitative framework for estimating the respective benefits of reading a candidate set and reading a batch of posting lists (in terms of the amount of read time saved), the system 110 can determine a net cost being the difference between the read time incurred and the read time saved, as follows:

$$\text{NetCost}(X) = S(|X[j_X + 1:]|) - \text{Benefit}(X) \quad (12)$$

$$\text{NetCost}(B_{i+1,i'}) = \sum_{x=i+1}^{i'} L(f_x) - \text{Benefit}(B_{i+1,i'})$$

Figure 7A:
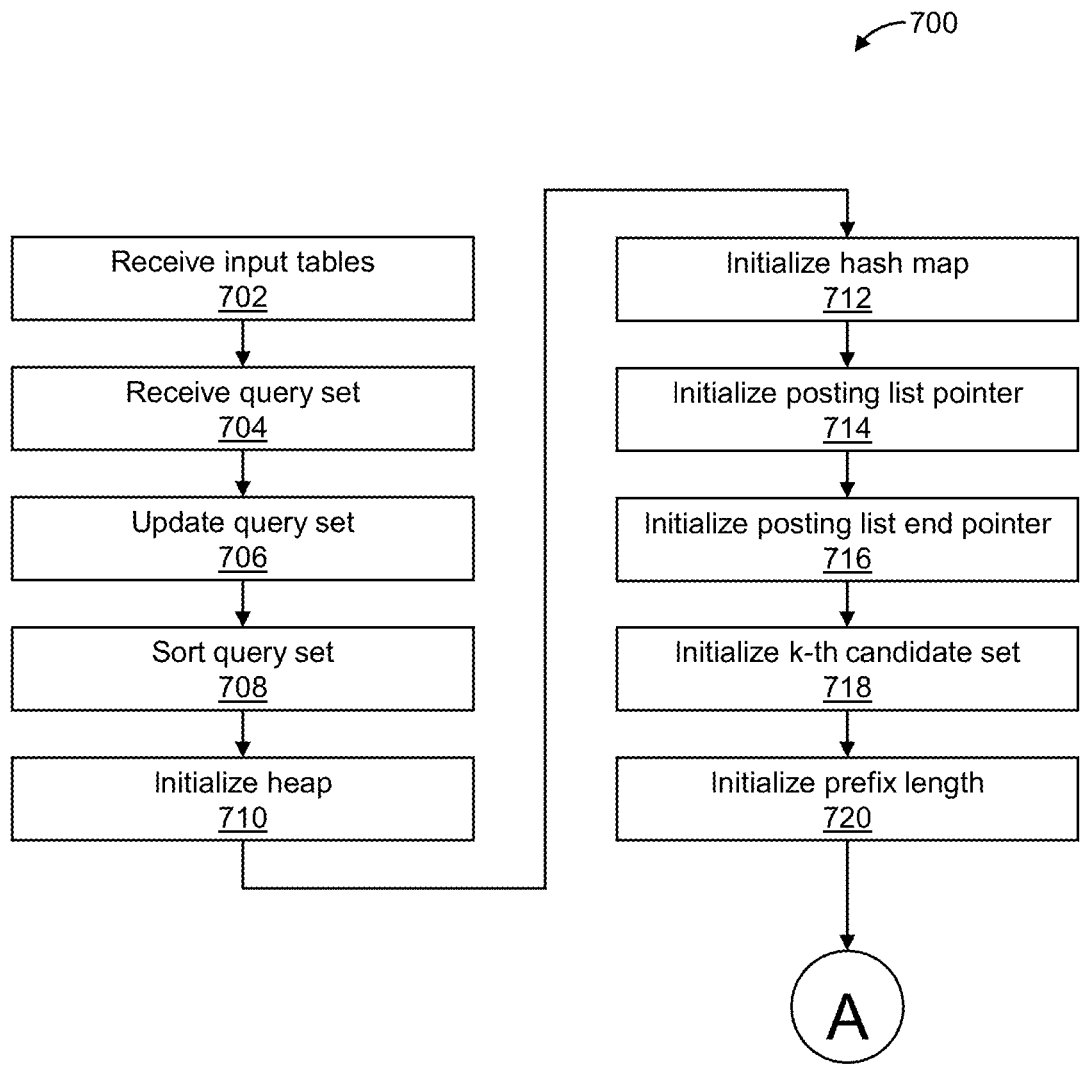
FIG. 7A is a diagrammatic flow diagram of a method for set overlap searching of data lakes, according to an embodiment.
Figure 7B:
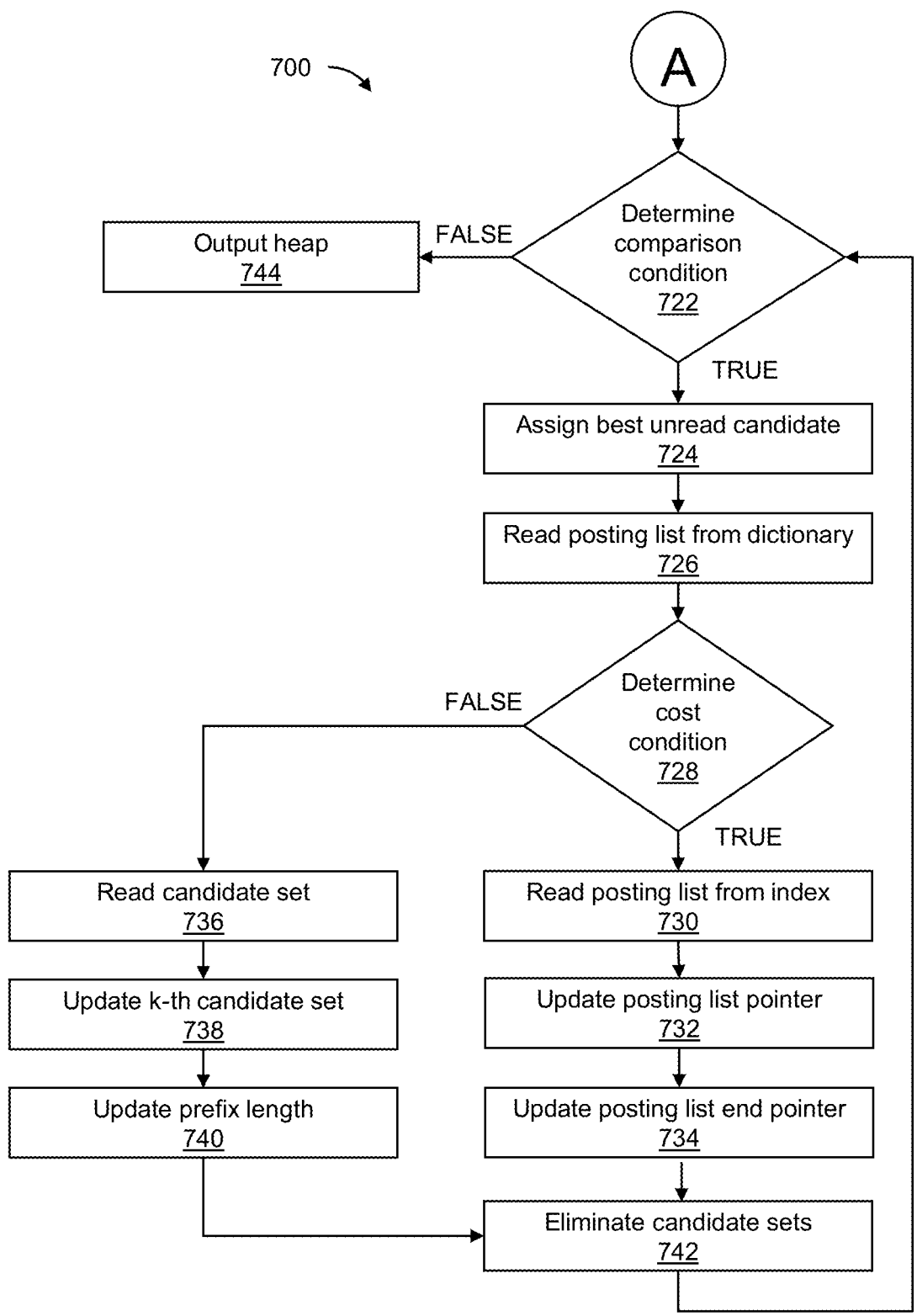
FIG. 7B is a continuation of the diagrammatic flow diagram of the method of FIG. 7A.

FIGS. 7A and 7B collectively illustrate a method for set overlap searching of data lakes 700, according to an embodiment. In the method for set overlap searching of data lakes 700, the system 110 receives data from the data lake 140 and outputs the top-k (for example, the top 10) sets based on their overlap with a query set. For the purposes of readability, FIG. 7B continues from FIG. 7A at point®. The method for set overlap searching of data lakes 700 is based at least in part on a quantitative analysis of the benefits using an approach based on computer-driven statistical approximation analysis. In a particular case, the method for set overlap searching of data lakes 700 involves choosing when to read lists and when to read sets based on the estimated benefit of each.

At block 702, the input module 136 receives the tables of data from the data lake 140. At block 704, the input module 136 receives an input table with a specified column, also called the query set Q. The input table and specified column can be received, for example, from a user via the input interface 116, or via another computing device via the network interface 120. This data is provided so as to obtain the top-k tables (from the data lake 140) that can be joined with the input table on the specified column. In this case, the number of distinct values in the resulting join column is used to measure the relevance of the returned tables.

At block 706, the search engine 132 updates the query set to include the tokens of the query set that are in the set of all tokens in the dictionary, also called the dictionary U. In other notation, Q←Q∩U. Generally, the dictionary is a mapping of known tokens to their posting list pointers (for example, as in TokenID discussed herein). An example of such a dictionary is in Table 1 showing how the dictionary can be used to map the tokens to their posting list pointers.

At block 708, in some cases, the search engine 132 applies global ordering (as described herein) to the query set. Each of the token values, also called $x_1, x_2, \ldots, x_n$, are sorted. In other notation, $x_1, x_2, \ldots, x_n \leftarrow \text{Sort}(Q)$.

At block 710, the search engine 132 initializes a heap for running top-k sets, also called h, as an empty array. In other notation, h←{ }). At block 712, the search engine 132 initializes a hash map of unread candidate sets, also called u, as an empty array. In other notation, u←{ }). At block 714, the search engine 132 initializes the posting list pointer, also called i, to one. In other notation, i←1. At block 716, the search engine 132 initializes the posting list end pointer, also called i', which indicates the position of the end of the next batch, to one more than the batch size, also called 1. In other notation, i'←1+λ. At block 718, the search engine 132 initializes the k-th candidate set, also called $X_k$, to an empty set. In other notation, $X_k \leftarrow \emptyset$. At block 720, the search engine 132 initializes the prefix length, also called p, to the size of the query set minus the size of the overlap between the query set and the k-th candidate set, all plus one. In other notation, P←|Q|−|Q∩$X_k$|+1.

At block 722, the search engine 132 determines a comparison condition of whether (a) the posting list pointer is less than or equal to the prefix length or (b) the hash map of unread candidate sets is not empty. In other notation, i≤p or u≠∅. In a particular case, block 722 can be the beginning of a while loop. If the condition is true, at block 724, the search engine 132 assigns the best unread candidate to the candidate set, also called X. In other notation, X←Best(u). In a particular case, Best(u) is a function that takes the hash map of unread candidate sets, u, as an argument and returns the unread candidate set that minimizes the NetCost(X) function, for example, as shown in Equation (12). If the condition is false, at block 744, the output module 138 outputs the heap for running top-k sets. In other notation, return PopAll (h). This output occurs when the posting list pointer is outside of the prefix filter range (i>p), and there is no unread candidate (u=∅).

At block 726, the search engine 132 reads the dictionary, U, to obtain the next batch of posting lists for a subset of the query set Q. In a particular case, the "next" batch of posting lists, also called $B_{i+1,i'}$, includes the posting lists starting from the posting list pointer moved to the next posting list and ending at the posting list end pointer. The next batch of posting lists is $B_{i+1,i'} = x_{i+1}, x_{i+2}, \ldots, x_{i'}$. In other notation, $B_{i+1,i'}$=ReadDictionary(U, Q, i+1, i').

At block 728, the search engine 132 determines a cost condition of whether (a) the size of the heap is equal to k and (b) the net cost of reading the best unread candidate is greater than the net cost of reading the next batch of posting lists, or whether (c) both the hash map of unread candidate sets is empty and the candidate set is empty. In other notation, the second conditions are: |h|=k and NetCost (X)>NetCost($B_{i+1,i'}$) or (u=∅ and X=∅).

The net cost of reading a candidate set is determined by the search engine 132 as the difference between the read time incurred and the read time saved. In a particular case, the read time incurred is the time of reading the candidate set from the position immediately after the position in the candidate set of the most recent token that overlaps with the query set to the end of that candidate set. The read time, also called S(•), is a function of the size of the set. The start position described above is also called $j_X$+1. In other notation, the read time incurred is $S(|X[j_X+1:]|)$.

In a particular case, for the candidate set, the read time saved, or "benefit", consists of two parts. The first part (also referred to as "PartOne") can be determined from eliminating posting lists through the prefix filter update. This first part is the sum of the time required to read the posting lists that are eliminated. It is based on the time to read a posting list, also called L(•), as a function of the length of the list, the argument of the function being the frequency of those tokens, also called $f_i$, of those posting lists to be eliminated. The posting lists to be eliminated are those from the position immediately after the new prefix length, also called p', to the current prefix length, also called p. In other notation:

$$PartOne(X) = \sum_{p'+1}^{p} L(f_i)$$

The time to read a posting list, $L(\bullet)$, can be estimated using a linear function, expressed in terms of index access time and read time, as discussed herein, for example in reference to Equation (14). In a particular case, $L(f_j)=l_0+l_1 \cdot f_j$, where $l_0$ is the index access time and $l_1$ is a factor of the read time. In some cases, the parameters for this linear equation, $l_0$ and $l_1$, can be experimentally estimated or previously determined.

In PartOne(X) above, a current prefix length is $p=|Q|-|Q \cap X_k|+1$. A new prefix length (after reading X) is $p'=|Q|-|Q \cap X_k'|_{est}+1$, where $|Q \cap X_k'|_{est}$ is an estimated new threshold. This estimated new threshold can be determined by the search engine 132 using Equation (5) as follows:

$$|Q \cap X_k'|_{est} = \begin{cases} |Q \cap X_k| & \text{if} |Q \cap X|_{est} \leq |Q \cap X_k| \\ |Q \cap X|_{est} & \text{if} |Q \cap X|_{est} > |Q \cap X_k| \\ & \text{and } |Q \cap X|_{est} \leq |Q \cap X_{k-1}| \\ |Q \cap X_{k-1}| & \text{if} |Q \cap X|_{est} > |Q \cap X_{k-1}| \end{cases} \quad (5)$$

An estimator for the overlap between Q and X, which can be used in the above determination, can be based on the position in Q of the first token that overlaps with X; where X first appears in the posting list of that token, also called $i_{X,0}$. Such an estimator, based on uniform distribution of the tokens from $i_{X,0}$ to the end of Q, can be determined using Equation (4) as follows:

$$|Q \cap X|_{est} = \frac{|Q[1:i] \cap X|}{i - i_{X,0} + 1} \times (|Q| - i_{X,0} + 1) \quad (4)$$

The second part of the benefit (also referred to as "PartTwo") can be derived from eliminating candidate sets by updating the position filter. This second part is the sum of the time it would take to read the eliminated candidates from the set of all unread candidates, also called $W_i$. It is based on the time to read a candidate set, Y, from the position immediately after the position in Y of the most recent token that overlaps with the query set to the end of Y. This sum is obtained by adding the sizes of these parts of set Y for which the position filter for Y has upper-bound overlap less than or equal to the estimated new threshold. In other notation:

$$PartTwo(X) = \sum_{Y \in W_i, Y \neq X} (S|Y[j_Y + 1:]|) \cdot I(|Q \cap Y|_{ub} \leq |Q \cap X_k'|_{est})$$

The time to read a candidate set, $S(\bullet)$, can be estimated using a linear function, expressed in terms of index access time and read time, as discussed herein, for example in reference to Equation (14). In a particular case, $S(|X|)=s_0+s_1 \cdot |X|$, where $s_0$ is the index access time and $s_1$ is a factor of the read time. The parameters for this linear equation, $s_0$ and $s_1$, can be experimentally estimated or previously determined.

Combining the two parts, the benefit can be determined as: Benefit(X)=PartOne(X)+PartTwo(X). The net cost of reading a candidate set, in this case, is NetCost(X)=S(|X[$j_X$+1:]|)−Benefit(X).

The net cost of reading the next batch of posting lists is determined by the search engine 132 as the difference between the read time incurred and the read time saved. In a particular case, the read time incurred is the sum of the time to read the posting lists from the position immediately after the current posting list pointer, also called i, to the posting list end pointer, also called i'. It is based on the time to read a posting list, also called $L(\bullet)$, as a function of the length of the list, the argument of the function being the frequency of those tokens, also called $f_x$, of those posting lists. In other notation, the read time incurred is: $\Sigma_{x=i+1}^{i'} L(f_x)$.

In a particular case, for the next batch of posting lists, the read time saved, or "benefit", is determined by the search engine 132 as a sum of two terms that is carried out over the set of all unread candidates, also called $W_i$. The first term is the time spent on reading candidate X, corresponding to the cost saved due to the elimination of X by reading the next batch of posting lists. It is based on the time to read a candidate set, X, from the position in X of the most recent token that overlaps with the query set, also called $J_x$, to the end of X. The first term is included in the summation if the estimation for the future upper-bound of X in the position filter is less than or equal to the current threshold (i.e., the current k-th candidate's overlap). In other notation:

$$TermOne(X)=S(|X[j_X:]|) \cdot I(|Q \cap X|_{ub,est'} \leq |Q \cap X_k|)$$

The second term in the summation is the reduction in read time for reading X when it is not eliminated, but due to an updated position filter, fewer of its tokens need to be read. The reduction in read time is the difference between (a) the time to read a candidate set, X, from $j_x$ to the end of X and (b) the time to read a candidate set, X, from the position in the future after reading the next batch of posting lists ending at the posting list end pointer, also called $j_x$, to the end of X. This reduction in read time is included in the summation if the estimation for the future upper-bound of X in the position filter is less than or equal to the current threshold (i.e., the current k-th candidate's overlap). In other notation:

$$TermTwo(X)=(S(|X[j_X:]|)-S(|X[j_X':]|)) \cdot (|Q \cap X|_{ub,est'} \leq |Q \cap X_k|)$$

In TermTwo(X), the estimation for the future upper-bound of X in the position filter can be determined by the search engine as follows:

$$|Q \cap X|_{ub,est'}=|Q[1:i] \cap X|+|Q[i+1:i'] \cap X|_{est}+\min(|Q|-i',|X|-j_{X,est}') \quad (10)$$

The first value in this estimation is the size of the overlap between tokens 1 to i of the query set and the candidate set. The second value in this estimation is an estimate of the overlap between tokens i+1 to i' of the query set and the candidate set, which can be determined as follows:

$$|Q[1+i:i'] \cap X|_{est} = \frac{|Q[i_{X,0}:i] \cap X|}{|Q|-i_{X,0}+1} \cdot (i'-i)$$

The second value is based on a first overlapping position, also called $i_{X,0}$, which is the position in Q of the first token that overlaps with X, where X first appears in the posting list of that token. The third value in this estimation is the lesser of (a) the number of tokens in the query set from i' to the end and (b) an estimate of the number of tokens from the predicted position in the future after reading the next batch of posting lists ending at i' to the end of the candidate set. This predicted position can be determined by the search engine 132 as follows:

$$j'_{X,est} = j_X + \frac{i'-i}{|Q|-i_{X,0}+1} \cdot (|X|-j_{X,0}+1)$$

where the above is a proportional offset to the most recent position in X whose token overlaps with Q, also called $j_X$.

Combining the two parts, the benefit can be determined as: Benefit($B_{i+1,i'}$)=$\Sigma_{X \in W_i}$(TermOne(X)+TermTwo(X)). The net cost of reading the next batch of posting lists, in this case, is NetCost($B_{i+1,i'}$)=$\Sigma_{x=i+1}^{i'}$L($f_x$–Benefit($B_{i+1,i'}$)).

At block 730, the search engine 132 reads the posting list from the inverted index. More specifically, the hash map is assigned the union of the hash map with the next batch of posting lists. In other notation, u←u ∪ReadInvertedIndex(I, $B_{i+1,i'}$). At block 732, the search engine 132 assigns the posting list end pointer to the posting list pointer. In other notation, i←i'. At block 734, the search engine 132 increments the posting list end pointer by the batch size. In other notation, i'←i'+λ.

At block 742, the search engine 132 eliminates candidate sets. In a particular case, a position filter is applied to the hash map of unread candidate sets. In other notation, u←PositionFilter(u). In this case, the position filter can be performed at the end of each iteration of the loop. This advantageously eliminates some unread candidates, thus making the hash map of unread candidate sets smaller; and thereby makes the server 110 perform its task faster. The search engine 132 returns to block 722 to determine whether it still has to finish the remaining candidates by determining the first conditions, either reading posting lists or reading sets. If the first conditions are false, at block 744, the output module 138 outputs the heap for running top-k sets. In other notation, return PopAll(h).

In a particular case, the function PositionFilter(u) updates the position filter utilizing Equation (6). Equation (6) computes the upper bound of the overlap between a candidate set Y and the query set Q. If this upper bound $|Q \cap Y|_{ub}$ is less than or equal to the k-th overlap in the heap, $Q \cap X_k$, then this set Y is eliminated by the position filter. The heap is an always-sorted list of (SetID, Overlap), sorted by Overlap, which is the corresponding set's overlap with the query set. Since the set overlap search is used to return the top-k results, the heap has a maximum length of k.

If the second conditions are false, at block 736, the search engine 132 reads the candidate set. More specifically, the heap for running top-k sets is updated based on the overlap between the query set and the candidate set. In other notation, TryPopPush(h, k, X, |Q∩X|).

In a particular case, there are three cases that can arise when updating the heap, which maintains a sorted list of (SetID, Overlap) by Overlap with the query set in decreasing order. In the first case, when there are less than k items in the heap, since only k results are requested, TryPopPush appends the new set X's ID and overlaps to the heap, and keeps the heap sorted (i.e., "Push"). Alternatively, when there are equal to or more than k items in the heap, TryPopPush compares the overlap of X with the current k-th itemset in the heap. If the current k-th set has larger overlap with the query set than X does, then this gives rise to the second case: no action is required (i.e., no "Pop" or "Push"). If the current k-th set has smaller overlap with the query set than X does, then this gives rise to the third case: TryPopPush removes the current k-th set from the heap (i.e., "Pop") and puts it in X (i.e. "Push").

At block 738, the search engine 132 assigns the head of the heap to the k-th candidate set then updates it to include only the tokens that are also in the query set. In other notation, $X_k$, $|Q \cap X_k|$←Head(h). Since the heap stores both (SetID, Overlap), Head(h) returns the ID of the current k-th set and its overlap from the heap.

At block 740, the search engine 132 updates the prefix length to the size of the query set minus the size of the overlap between the query set and the k-th candidate set, all plus one. In other notation, p←|Q|–|Q∩$X_k$|+1. At block 742, the search engine 132 eliminates candidate sets as described herein.

In this embodiment, starting from reading the first batch of posting lists, the functions NetCost(X) and NetCost($B_{i+1,i'}$) are used to determine whether to read the best unread candidate, ranked by net cost, or to read the next batch of posting lists. Each time a candidate set is read, the running top-k heap and the prefix filter can be updated. Each time posting lists are read, the pointers can be updated. Either way, after the read, the position filter is applied to eliminate unqualified candidates.

Since the threshold |Q∩$X_k$| is, in most cases, only valid (or non-zero) after at least k candidates are read, candidate sets before the top-k heap is full (|h|=k) are chosen to be read, unless the first batch (u=∅ and X=∅) is being read.

The method for set overlap searching of data lakes 700 is terminated when the posting list pointer i is outside of the prefix filter range (i>p), and there is no unread candidate (u=∅). If i>p but u≠∅; meaning that the remaining candidates are to be either read of posting lists or reading sets.

For the purposes of illustration, the method for set overlap searching of data lakes 700 can be implemented using the following example procedure:

```
1:   procedure Adapt(U, I, Q, k, λ) ▷ U, I are the dictionary and inverted index; λ is the batch
     size
2:      Q ← Q ∩ ▷Use the dictionary
3:      x₁,x₂, . . . , xₙ ← SORT(Q) ▷ Apply global ordering
4:      h ← { } ▷ h is the heap for running top-k sets
5:      u ← ▷ u is the hash map of unread candidate sets
6:      i ← 1, i' ← 1 + λ, Xₖ ← ∅ ▷Xₖ is the k-th candidate set
7:      p ← |Q| – |Q ∩ Xₖ| + 1
8:      while i ≤ p or u ≠ ∅ do
9:         X ← BEST(u)
10:        if |h| = k and NETCOST(X) > NETCOST(B_{i+1,i'}) ▷Read set X
11:           u ← u ∪ READINVERTEDINDEX(B_{i+1,i'}) ▷Read posting lists
```

-continued

```
12:        i ← i', i' + λ
13:     else
14:        TRYPOPPUSH(h, k, X, |Q ∩ X|) ▷Read set X
15:        X_k, |Q ∩ X_k| ← HEAD(h)
16:        p ← |Q| − |Q ∩ X_k| + 1
17:     end if
18:     u ← POSITIONFILTER(u) ▷ Eliminate candidates
19:  end while
20:  return PopALL(h)
21: end procedure
```

In an embodiment, a total runtime of the method for set overlap searching of data lakes 700 can be determined as follows:

$$\Sigma_{i=i'}^{p^*} L(f_i) + \Sigma_{i=p^*+1}^{p^*+\delta} L(f_i) + \Sigma_{X \in W \setminus V} S(|X[j_X:]|) \qquad (13)$$

The above Equation (13) is similar to that of ProbeSet, Equation (3); however, it has a few differences. A first difference is that in ProbeSet, no more posting lists are read after the last position in the final prefix, indicated by p*, while in the method for set overlap searching of data lakes 700, the net cost of reading the next batch of posting lists may be less than reading the next candidate set, leading to more posting lists read. The symbol 6 indicates the extra posting lists read after the final prefix position. The extra posting lists are only used to help reduce the read time of existing candidates, and do not introduce any new candidates, as those candidates will be pruned automatically by the prefix and position filters.

A second difference is the last term. Instead of reading every qualified candidate as the system 110 encounters them as in ProbeSet, in the method for set overlap searching of data lakes 700, the candidates are read in increasing order of their net costs, and thus the candidates with the highest pruning effect (i.e., benefit) get read first. Thus, the system 110 following the method for set overlap searching of data lakes 700 will, advantageously, generally read no more candidates than ProbeSet, and often many fewer. That is, V⊆V*, where V is the set of candidates that are pruned at first encounter only, and V' is the set of all candidates that are pruned in the method for set overlap searching of data lakes 700. Note that, in most cases, V'=Ø is extremely unlikely as it happens only when the candidates appear in the order of strictly increasing overlap with the query.

A third difference is the read time for each candidate. ProbeSet reads a qualified candidate at first encounter, thus the read time is $S(|X[j_{X,0}:]|)$. The system 110 following the method for set overlap searching of data lakes 700, on the other hand, can read a candidate at some posting list after the first encounter, due to reading in batch and using the cost model. Thus, following the method for set overlap searching of data lakes 700 will almost always have fewer tokens to read for any candidate (in the worst case, read the full set like ProbeSet). Advantageously, spending less time on reading the candidates. The system 110, following the method for set overlap searching of data lakes 700, will generally read fewer candidates than ProbeSet, and often a smaller portion of those candidates.

Although the cost model works with any global order, embodiments described herein can use increasing frequency order as the global order, because it tends to minimize the number of candidate sets in the prefix. Another advantage of using frequency order is that duplicate posting lists are together, and this can be used to further optimize the search engine.

Two posting lists are duplicates if they point to the same sets. Because of the frequency ordering (and within a frequency, lists can be ordered by some fixed ordering on sets), duplicate lists will generally be adjacent. In an example experiment ran by the present inventors using Open Data and Web Table, many duplicate posting lists were observed. This is due to many data values appearing only once in a single column (for example, UUIDs), or they strictly co-occur with some other values, such as provinces' names of a country. The example experimental statistics are illustrated in Table 2 as follows:

TABLE 2

Posting lists in Open Data and Web Tables

|  | #Original | %Dup | #After De-dup |
|---|---|---|---|
| Open Data | 563,320,456 | 98% | 9,003,658 |
| Web Tables | 184,644,583 | 83% | 45,395,793 |
| Enterprise Data | 3,902,604 | 9.87% | 9,133 |

Even though reading multiple duplicate posting lists does not necessarily yield more candidate sets than reading just one, it can still advantageously still provides the benefit of reducing the cost of reading existing candidate sets.

In order to avoid reading duplicate posting lists, the system 110 can assign each token in the dictionary a duplicate group ID, which is a unique identifier for a group of duplicate posting lists. So when matching a query with the dictionary, a duplicate group ID is also mapped to query tokens, in addition to the frequency and posting list pointer.

Figure 8:
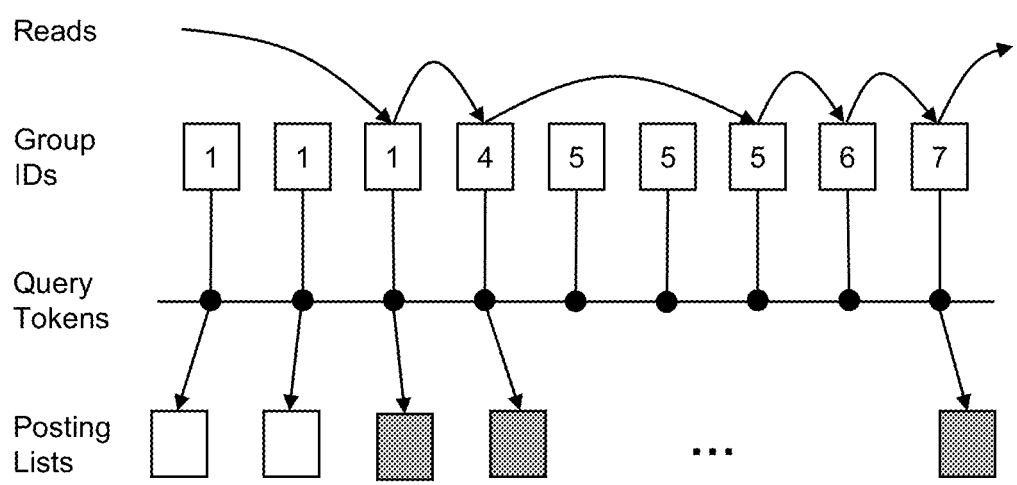
FIG. 8 illustrates a diagrammatic example of a read sequence of distinct posting lists.

In some cases, the cost model assumes the posting lists of a query set are read sequentially in the frequency order of their tokens. When going through the posting lists, the posting list of the last token in each group present in the query are read. This can be done by checking if the next token has the same or different duplicate group ID as the current one. If the next one has the same duplicate group ID, then the posting list can be skipped. An example of this is illustrated using the example in FIG. 8: the first and second posting lists with duplicate group ID 1 are skipped, and the first two posting lists with duplicate group ID 5 are also skipped.

In some embodiments, the cost model can be modified to handle duplicates. First, the system 110 can count groups, rather than lists when forming batches, and thus ignores the skipped posting list in calculating the read cost. Second, the system 110 can account for the number of posting lists skipped when reading the last posting list in the same duplicate group. So the information about candidate sets, such as the number of partial overlaps, is updated correctly.

Figure 9:
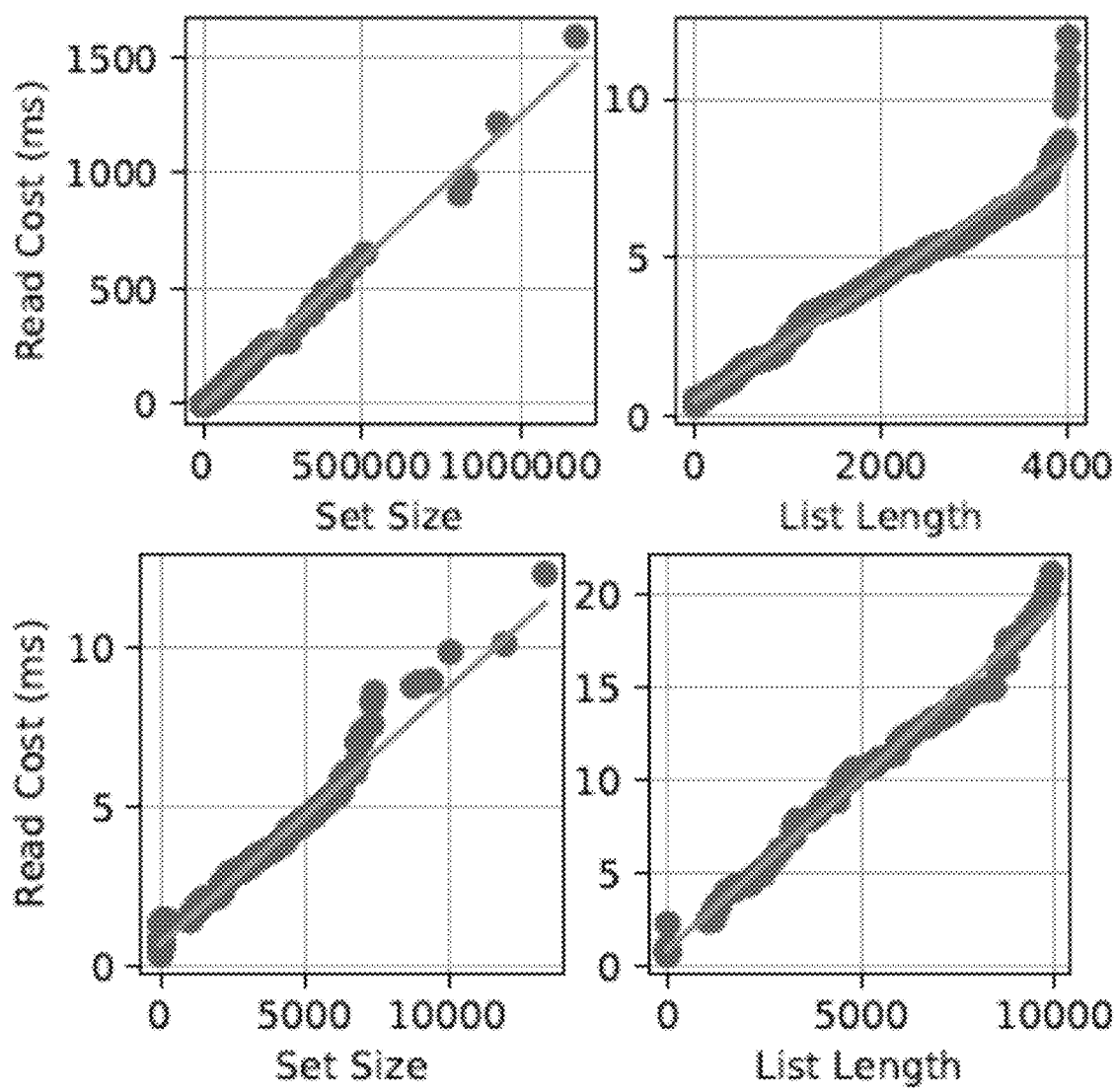
FIG. 9 illustrates four charts from an example experiment, showing samples and fitted lines from sets on the left side charts and posting lists on the right side charts, the top charts using Open Data dataset and the lower charts using Web Tables dataset.

FIG. 9 illustrates samples and fitted lines from sets and posting lists in Open Data and Web Tables, respectively, from the example experiment conducted by the present inventors. These samples can be used for another possible optimization related to estimating costs.

The cost of reading a candidate set and a posting list can be determined using functions S(•) and L(•) respectively. There are different components involved when a candidate set or a posting list is read. First, there is index access time, which is the time to find where the set or posting list is located in the storage layer (for example, Non-Volatile Storage 122, RAM 114, or the like) given its pointer. For the example of Open Data, since there are more than 563 million posting lists, this time can be significant. Then, there is the time to read the set or posting list from the storage layer, and the time to transfer the data through network or inter-process communication, which also involves serialization and deserialization. These components can be collectively called read time.

The index access time is likely a constant, especially with popular indexes such as B+Tree used by many storage layers. On the other hand, the read time is proportional to the size of data. When the storage system is disk-based, read may be accelerated through sequential I/O, however, the data still needs to be transferred to the search engine process, and that takes time proportional to the size of the data.

The system 110 can accordingly use linear functions to express the read cost, for example, as follows:

$$S(|X|)=s_0+s_1\cdot|X|, L(f_i)=l_0+l_1\cdot f_i \qquad (14)$$

where $s_0$ and $l_0$ are the index access times, and $s_1$ and $l_1$ are the factors for the read times.

In the example experiment, in order to estimate the parameters in Equation (14), 1,000 sets and 1,000 posting lists were sampled, I/O times were measured, and the functions were fit to the sampled data points. FIG. 9 illustrates samples and fitted lines, for the example experiment, from sets and posting lists in Open Data and Web Tables, respectively.

FIGS. 10 to 15 illustrate experimental results from the example experiment that demonstrate the performance of the present embodiments. The plots demonstrate the performance using the real-world table repositories, and compare such performance to other approaches that use either exact or approximate approaches. As stated, the two table repositories in the example experiments are, Open Data ("OD") and WebTables ("WT"). Open Data was prepared by crawling entire indexes of U.S. (data.gov), U.K. (data.gov.uk), and Canadian (open.canada.ca) portals, and 215,393 tables were received in CSV format. Web Tables was prepared by downloading WDC Web Table Corpus 2015 English-Relational Subset. This table repository contains 50,820,165 tables extracted from HTML pages on the Web in English.

For each repository, sets were extracted by taking the distinct values in every column of every table. All numerical values were removed as they create casual joins that are not meaningful. The characteristics of the extracted sets are shown in Table 2. Web Tables has 219× more sets than Open Data, while its average set size is much smaller (10 vs. 1,540). This means reading a set in Web Table is usually cheaper. However, for a fixed size, it is cheaper to read sets in Open Data because the B-Tree index size is smaller due to the smaller number of sets. The set-frequencies of tokens follow Zipfian-like distribution in both repositories, with approximately 63% and 65% of tokens, in Open Data and Web Tables respectively, appearing in only one set. Tokens in Web Tables appear in more sets overall than those in Open Data. This implies that inverted lists of Web Tables tokens are often longer, and thus more expensive to read.

Three query benchmarks were generated from each table repository. Each benchmark is a set of queries (sets) selected from a size range in order to evaluate performance on different query sizes.

For Open Data, the benchmarks are from three ranges: 10 to 1 k, 10 to 10 k, and 10 to 100 k. For the present disclosure, each benchmark is referred to using its upper-bound. For each benchmark, its range s divided into 10 equal-width intervals except for the first interval, which starts from 10. For example, for range 10 to 1 k, the intervals are [10,100], [100,200], and all the way to [900,1000]. 100 sets from each interval are sampled using uniform random sampling. Sampling by interval prevents a benchmark that has the same skewed distribution as the repository itself, and heavily biased to sample smaller sets. The effect of query size on performance was investigated, thus enough queries are needed on all size ranges to conduct meaningful comparisons.

For Web Tables, different ranges for benchmarks were used: 10 to 100, 10 to 1 k, and 10 to 5 k. The last range only has 5 intervals because the sets in Web Tables tend to be much smaller than Open Data, and there are not enough sets in the 5 k to 10 k range to sample 100 sets for every interval. In order to make up for the total, 200 sets were sampled for each of the 5 intervals.

For a query set Q, and dictionary of all tokens U in the index excluding the query, |Q∩U| was used instead of |Q| to decide which range the query belongs to. This is because any token that only exists in Q, but not in U will not have a posting list, and add uncontrolled noise to the experiment when it is desirable to measure the effect of number of posting lists on performance.

In this example experiment, a minimum size of 10 was used instead of 1. The set size distribution is Zipfian, so there are more sets in the range [1,10] than the rest of the ranges combined; 67% for Open Data, and 68% for Web Tables. For the purposes of the example experiment, the larger queries are more interesting and indicative of the challenges that must be overcome. For example, the larger queries are generally the reason why keyword search approaches are not suitable for joinable table search.

In the example experiment, an inverted index and dictionaries for each of the Open Data and Web Tables repositories was built and the posting lists and sets were stored in a database as two separate tables, with indexes built on tokens and sets. The example experiment was conducted on a computing machine with two Intel Xeon CPU E5-2620 v4 @ 2.10 GHz (16 cores), 128 GB DDR4 memory, and an Intel SSD DC S3520 3D MLC.

MergeList-D was based on MergeList, described herein, and modified to read only the distinct posting lists. Probe-Set-D was based on ProbeSet, described herein, and modified to also read only distinct posting lists. This experimental approach uses a prefix filter to limit the number of posting lists to read, and uses position filter to reduce the number of candidate sets to read. An approach using the present embodiments, referred to Adapt-D, in the case of the example experiment, uses a cost-based approach with distinct posting list optimization.

In the example experiment, a first test approach for approximate joinable table search uses a transformation that allows locality-sensitive hashing ("LSH") to be used with set containment similarity, |Q∩X|/|Q|→R[0.0,1.0], which is a normalized version of set overlap. Following this approach, the system 110 first uses an LSH index to acquire some candidate sets that are more likely than the rest to have set containment similarities above some threshold, and then reads and computes exact overlap for those candidate sets to obtain the ranked final results. In this case, to approach was modified to support top-k search by trying a sequence of decreasing thresholds starting at 1.0 with a step size equal to 0.05, until enough candidates have been acquired. Since this is approximate, it can be extremely fast by just returning any candidate set. So for a fair comparison, the experiment required the system 110 to keep acquiring and reading (distinct) candidate sets until a minimum recall of 60% is reached for the top-k candidates. The ground truth is provided to the algorithm for every query.

A second test approach is the same as the first test approach with the only difference being the minimum recall is 90%. A higher minimum recall means this approach has to read more candidate sets in order to improve accuracy.

Figure 10:
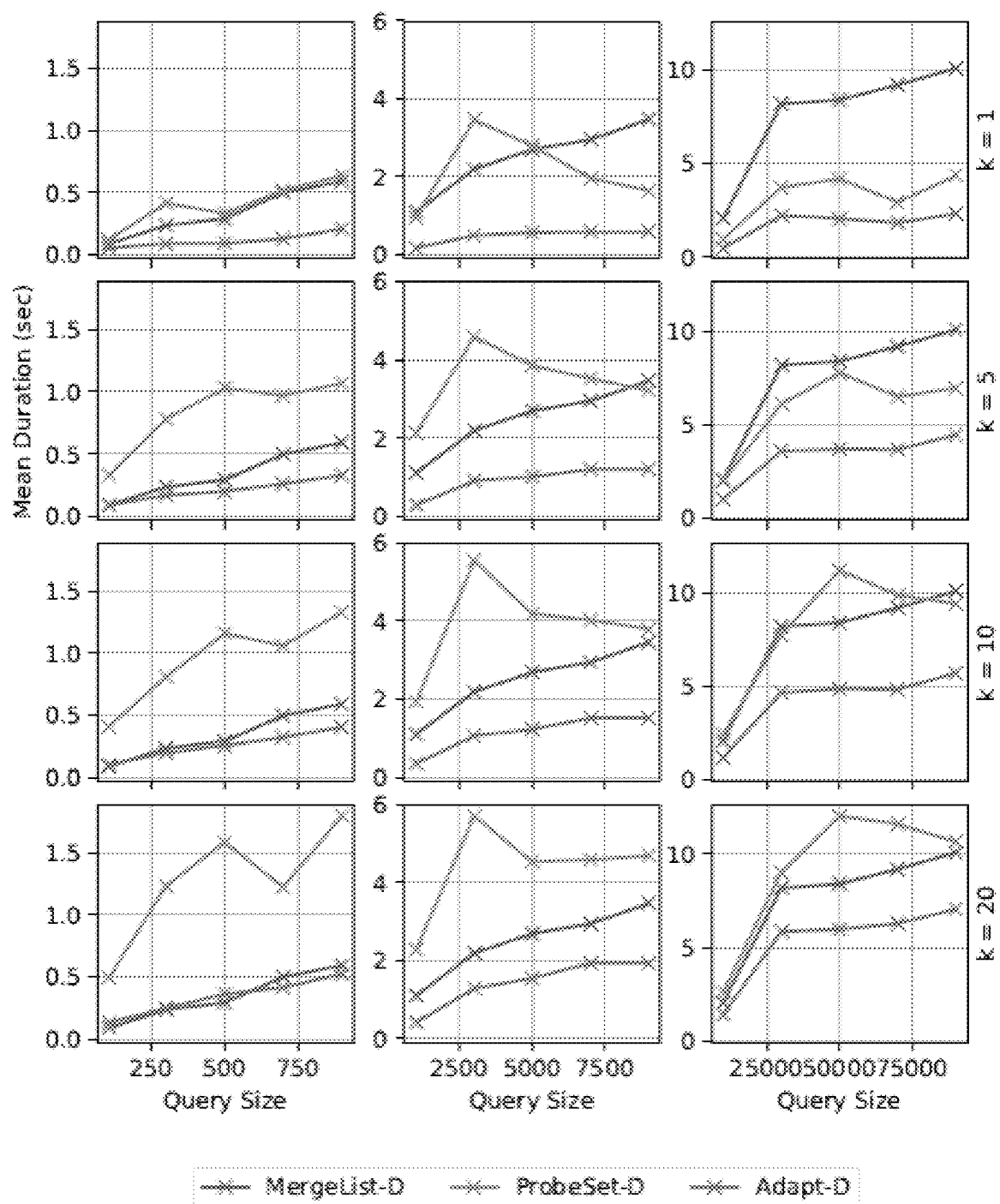
FIG. 10 illustrates twelve charts showing mean query time of the Open Data dataset for three approaches of the example experiment of FIG. 9.

First, the example experiment compared the running time of Adapt-D with baseline approaches MergeList-D and ProbeSet-D on benchmarks generated from Open Data tables. The result is shown in FIG. 10. Each row corresponds to a different k, which is the number of top results to retrieve, and each column corresponds to a different query benchmark (i.e., 1 k, 10 k, and 100 k). Each point is the mean running time of benchmark queries from two consecutive intervals (i.e., 2×100 queries).

In this example experiment, using ProbeSet-D and using MergeList-D were compared across different ks. At small k, ProbeSet-D is fast, more than 2× faster than MergeList-D at k=1 on the 100 k benchmark. However, as k increases, its performance deteriorates quickly. This is because with larger k, the prefix filter is larger and has less pruning power, as the k-th candidate's overlap can be much lower. Thus, Probe-Set-D must read more posting lists and all the candidate sets appear in those posting lists. In contrast, MergeList-D simply reads all the posting lists and none of the candidate sets, regardless of k. So its performance is constant with respect to k. This makes it relatively slower when k is small, as the k-th candidate may be in one of the earlier posting lists, and reading the rest is wasting time. However, as k grows larger, the k-th candidate may appear in a much later posting lists, and it becomes cheaper to just read all the posting lists, instead of reading candidate sets.

On the dimension of query size, ProbeSet-D generally scales better than MergeList-D. For example at k=5, Probe-Set-D is more than 2× slower with smaller queries on the 1 k benchmark, but becomes faster as the query size increases to the 100 k benchmark. This is because MergeList-D's running time is directly proportional to the query size (or the number of distinct posting lists after optimization), while ProbeSet-D may terminate much earlier before finishing reading all posting lists. This is at the expense of reading all the candidate sets in those posting lists, so the total running time could still be larger. Thus, the example experiment also shows that the reduced cost in reading posting lists in ProbeSet-D is not necessarily an improvement as it caused the time spent in reading sets to go up.

Lastly, it was observed that ProbeSet-D's running time was much more volatile than MergeList-D. This is shown in the first row of FIG. 11, which plots the standard deviation of query duration. This is because ProbeSet-D reads candidate sets in every posting list it reads, and it has no control over the sizes of those sets, thus its running time is heavily dependent on the distribution of posting list lengths (i.e., token frequencies) and set sizes given the tokens in the query set.

Adapt-D in the example experiment was determined to out-perform both ProbeSet-D and MergeList-D, on all benchmarks and all ks, often by two to four times; except for the k=20 and 1 k benchmark, on which it is on par with MergeList-D.

Increasing k when using Adapt-D reads candidate sets where the running time of Adapt-D increases with k, but at a much slower rate than ProbeSet-D. This is because unlike the latter, using Adapt-D does not read all the candidate sets it encounters, instead it reads the next candidate set with the lowest net cost (and likely carrying the most pruning power, or benefit) evaluated by the cost model, and aggressively prunes out unqualified candidates using the position filter.

Figure 11:
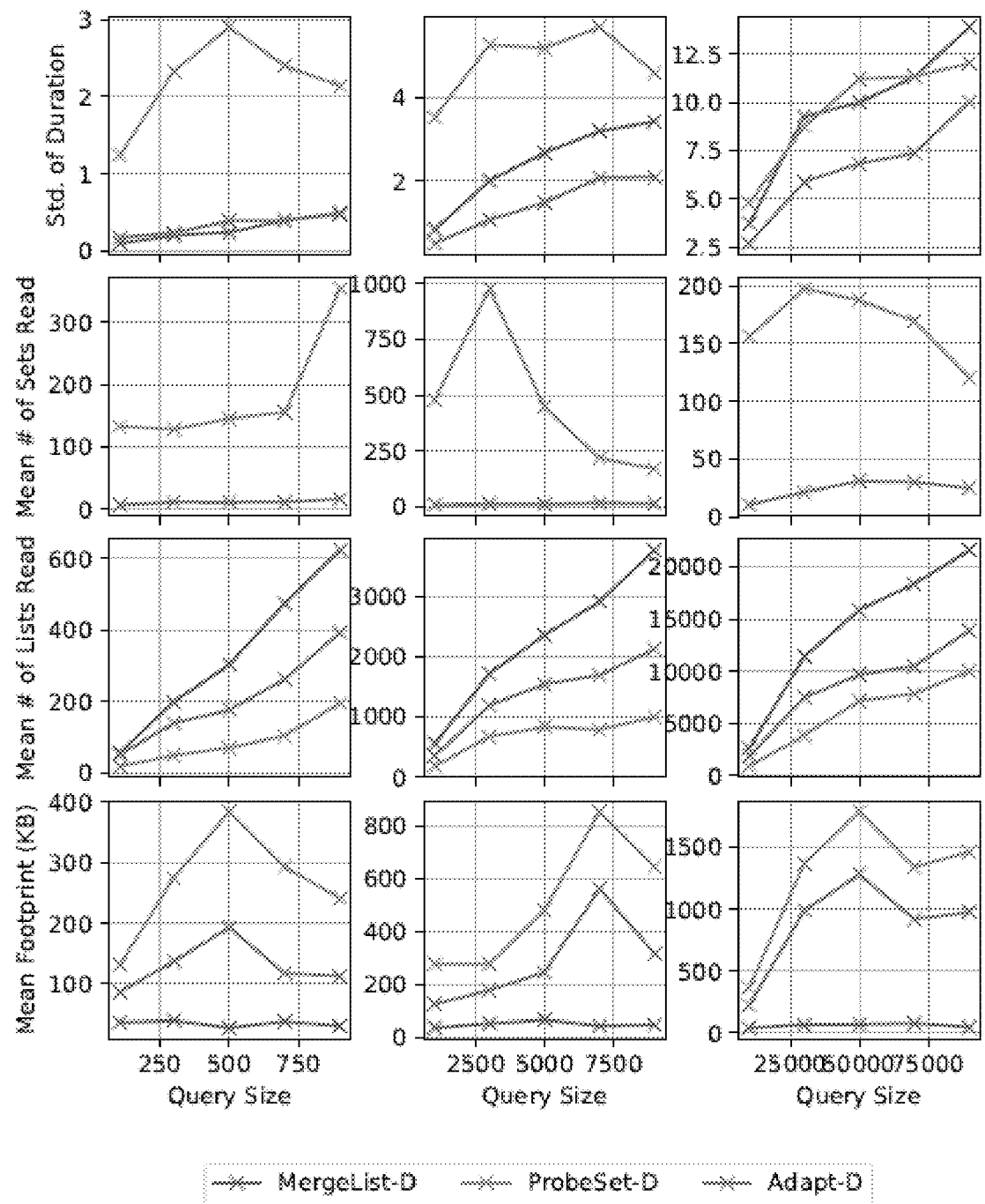
FIG. 11 illustrates twelve charts showing standard deviation of durations, mean number of sets and posting lists read per query, and query memory footprint of the Open Data dataset for three approaches of the example experiment of FIG. 9.

The second row of FIG. 11 compares the mean number of sets read by ProbeSet-D and Adapt-D per query. It is evident that Adapt-D drastically reduced the sets read by an order of magnitude (from well over 100 to around 30). This shows that the cost model is extremely effective in choosing the best next candidate to read, which causes the most aggressive pruning. The third row of FIG. 11 compares the mean number of posting lists read, which shows that using Adapt-D reads more posting lists than ProbeSet-D. This is because the net cost of reading posting lists may be lower than reading the next best candidates.

In the fourth row of FIG. 11, the memory footprint of query processing for the three algorithms is compared. Based on the results, ProbeSet-D used the most memory, and Adapt-D came in second. This is due to the large sets in the Open Data benchmark, as the two algorithms both need to allocate buffer for reading candidate sets. The relatively short posting lists in the Open Data benchmark also led to the low memory usage of MergeList-D, because it only read posting lists and was not affected by set sizes.

In comparison with Open Data, Web Tables has different characteristics as it has 219× more sets, but much smaller sets (average size 10 versus 1,540). Its tokens also have higher frequencies overall (average 4 versus 23), leading to larger posting lists that are more expensive to read.

Figure 12:
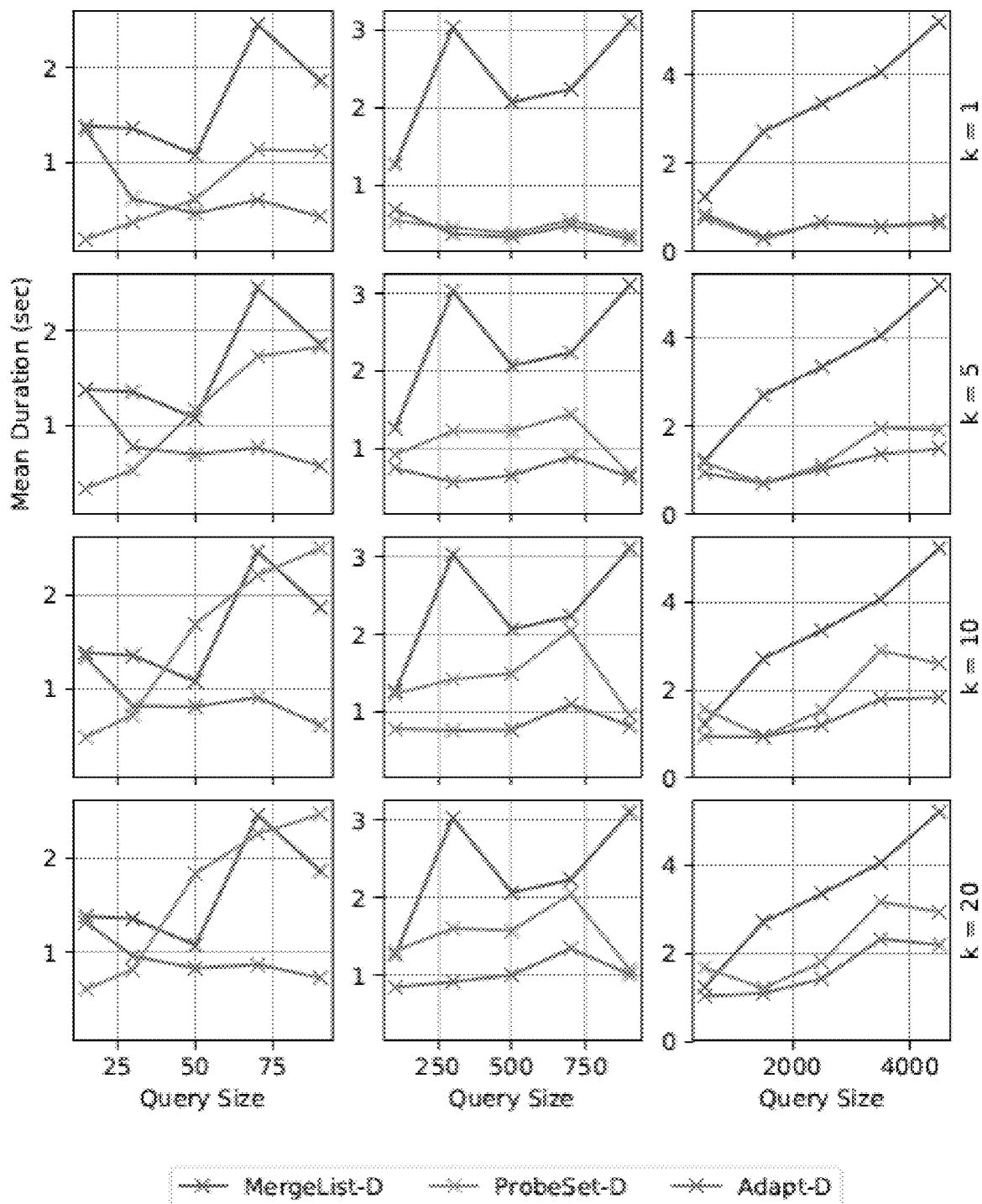
FIG. 12 illustrates twelve charts showing mean query time of the WebTable dataset for three approaches of the example experiment of FIG. 9.

The effect of large posting lists directly impacts the performance of MergeList-D, which must read all distinct posting lists for a query set. As shown in FIG. 12, using MergeList-D has the longest running time, and can be 3× slower than using ProbeSet-D and Adapt-D on k=1 and k=5. On the other hand, using ProbeSet-D benefits from the small set sizes in Web Tables, as the time saved from reading fewer large posting lists is larger than the time to read tiny sets. Consequently, for table repositories with similar distributions to Web Table, high token frequencies and small set sizes, search approaches making use of a prefix filter (for example, ProbeSet-D and Adapt-D) benefit from this distribution.

Figure 13:
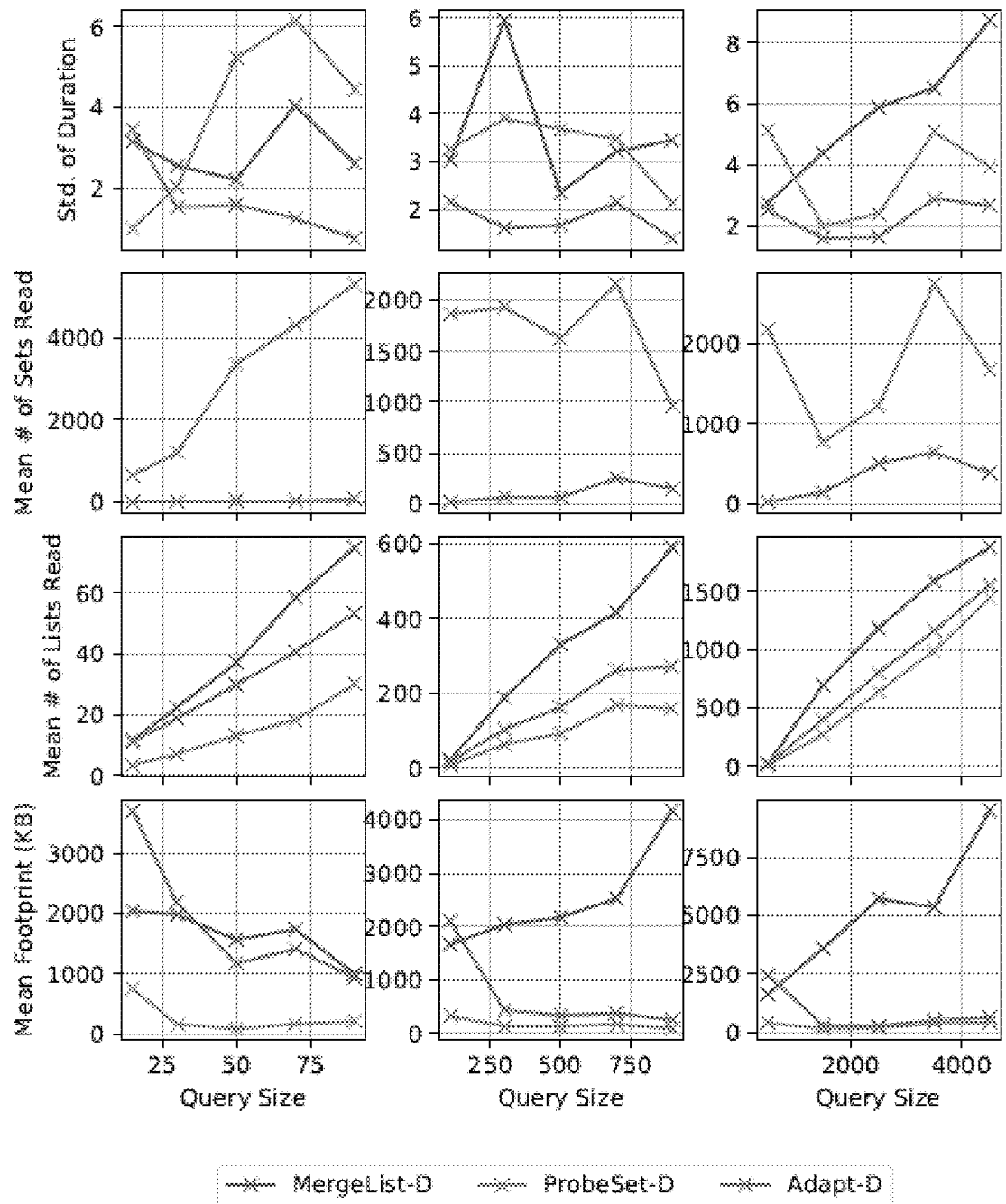
FIG. 13 illustrates twelve charts showing standard deviation of durations, mean number of sets and posting lists read per query, and query memory footprint of the WebTable dataset for three approaches of the example experiment of FIG. 9.

As shown in FIG. 12, using Adapt-D has superior performance to the other two approaches with lower variance, as shown in the first row of FIG. 13. Using Adapt-D mostly out-performs using ProbeSet-D despite the estimation time caused by having many candidate sets to look through. The second row of FIG. 13 shows that the number of candidate sets in Web Tables is much higher than Open Data, approximately 15× on the 1 k benchmark, for example. Using Adapt-D still requires reading an order of magnitude fewer candidates than using ProbeSet-D, so the estimation time is paid-off by the time saved from pruned candidate sets.

The fourth row of FIG. 13 shows the memory footprint of the three algorithms on Web Table benchmark. The result is very different from the Open Data benchmark: MergeList-D comes first in memory usage, exceeding the other two by an order of magnitude for query size larger than 250. This is due to the relatively much longer posting lists in the Web Table benchmark, making it much more costly space-wise to read posting lists. The smaller set sizes reduce the memory usage of both ProbeSet-D and Adapt-D, however, because the latter still reads more posting lists, it tends to use slightly more memory.

As shown in the second row of FIG. 13, Adapt-D uses more memory for smaller queries than larger ones because it tends to read posting lists rather than sets for small queries; and posting lists requires a larger buffer than sets for this benchmark.

Figure 14:
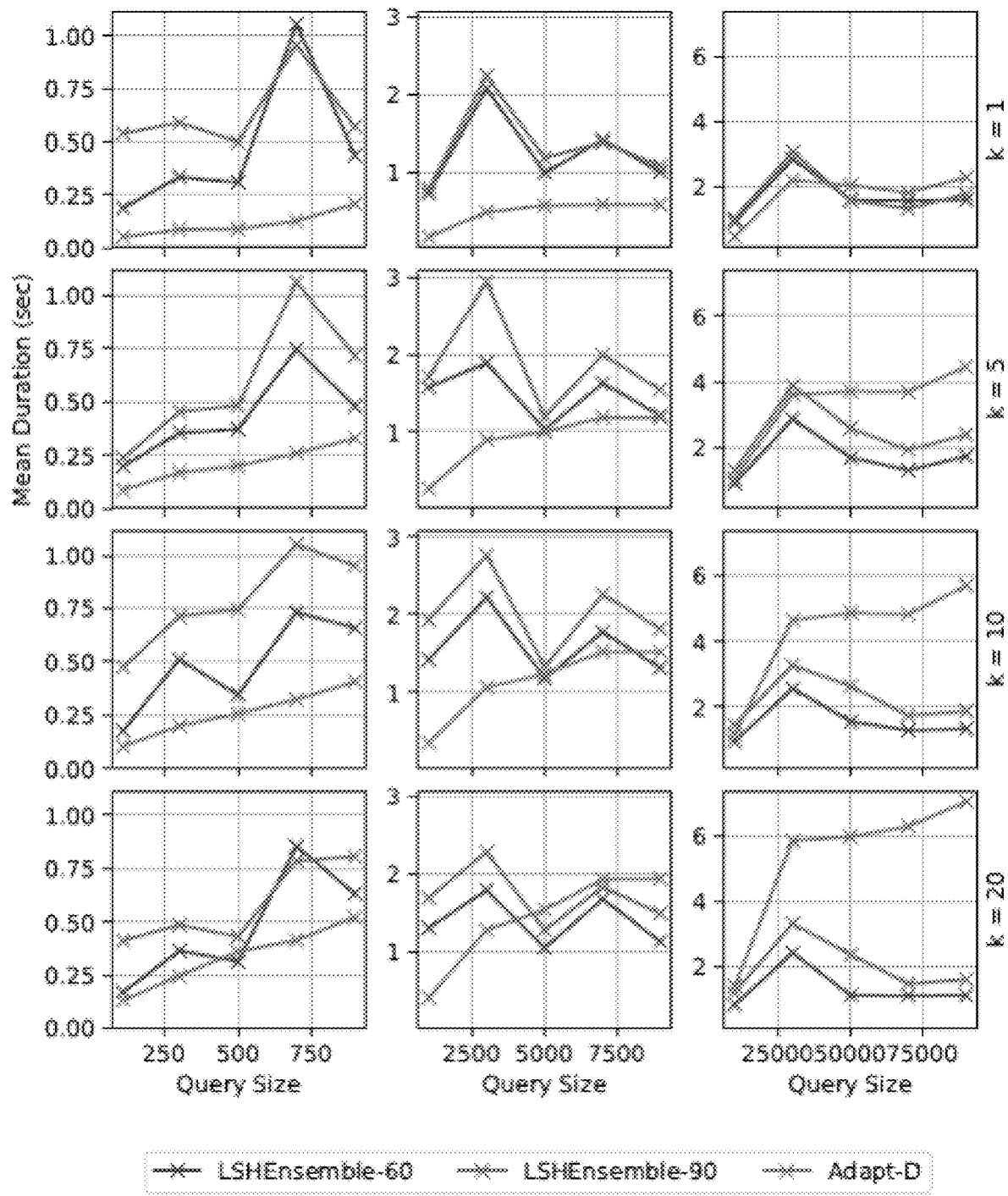
FIG. 14 illustrates twelve charts showing mean query time for two approaches for another example experiment using the Open Data dataset.

In a second example experiment, the present inventors compared using Adapt-D to using an LSH Ensemble approach, in this case, LSHEnsemble-60 and LSHEnsemble-90. FIG. 14 illustrates mean query durations. The LSH Ensemble query duration includes the time of retrieving candidates from the LSH index and the time to read and compute exact overlaps for candidates. The success of LSH algorithms is dependant on the fact that a first stage of candidate retrieval is extremely fast and can be very selective, such that the total query duration can be lower than exact algorithms. However, based on FIG. 14, in the second example experiment, it was observed that the performance of using Adapt-D can beat LSH Ensemble by 2× on 1 k benchmark for k=1 to k=10. This is highly impressive because LSH Ensemble is an approximate approach while using Adapt-D gives exact results. One possible reason for Adapt-D being faster at smaller k is because prefix filter can be much more selective than LSH index at high thresholds or small k, leading to very few posting list reads and smaller number of candidate sets reads.

The reason for Adapt-D being faster at smaller k is because of the fact that the prefix filter based exact techniques can be faster than LSH. This is because prefix filter can be much more selective than LSH index at high thresholds or small k, leading to very few posting list reads and a smaller number of candidate sets reads.

The LSH Ensemble is slower than Adapt-D for small queries. This is because the transformation from containment similarity (i.e., normalized overlap |Q∩X|/|Q|) to Jaccard similarity |Q|used by LSH Ensemble introduces additional false positive candidate sets, which causes wasted time spent in reading those sets. This influx of false positive candidates is the most severe at small queries, due to the skewed set size distribution where there are many more small sets than large sets. The sudden drop of candidate sets can be observed in the second row of FIG. 15, the plot for the 10 k benchmark. Unlike Adapt-D, LSH Ensemble cannot use position filter to prune out false positive candidate sets; it must read all candidate sets it encounters.

Figure 15:
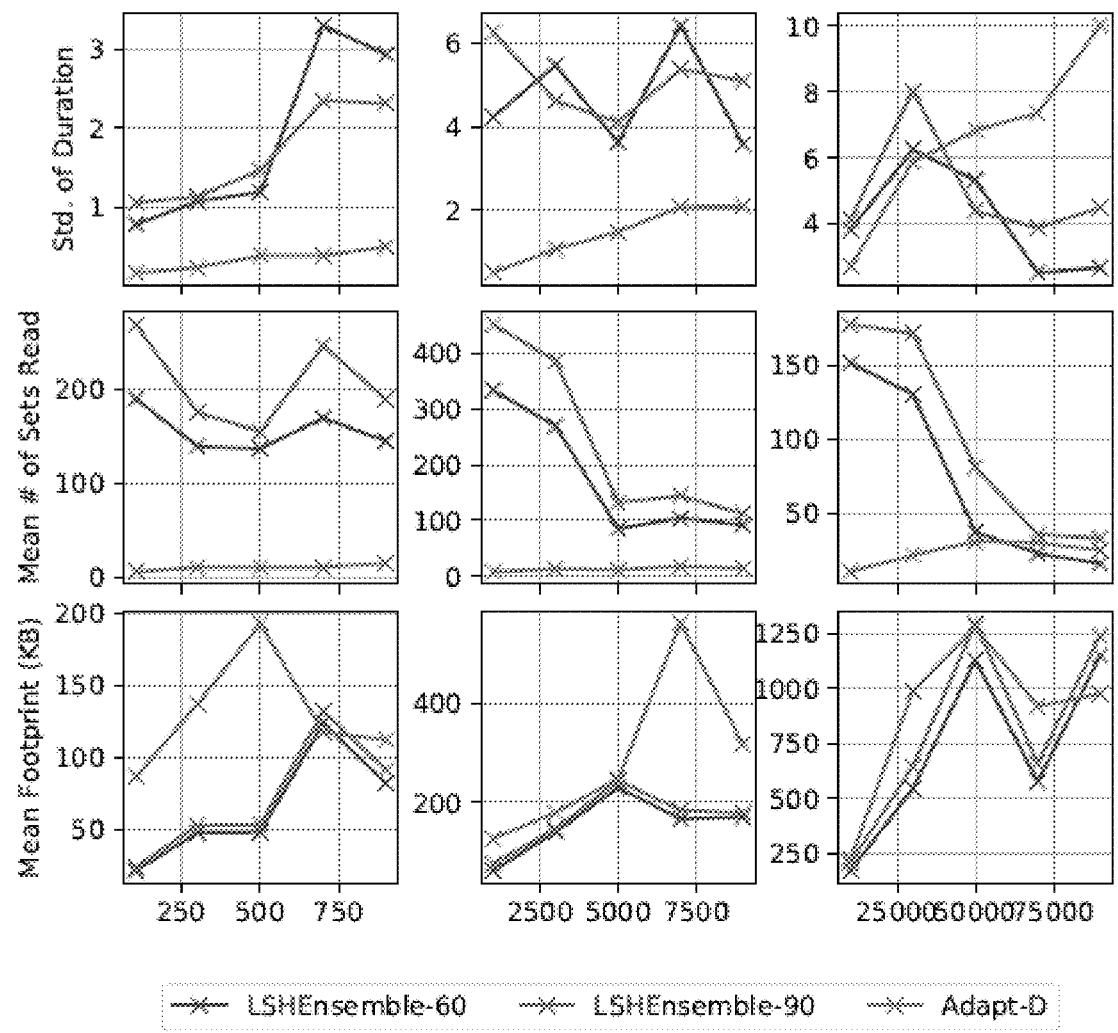
FIG. 15 illustrates nine charts showing standard deviation of durations, mean number of sets, and query memory footprint of the Open Data dataset of the example experiment of FIG. 14.

As shown in the 10 k and 100 k benchmarks of FIG. 15, the number of candidate sets read by LSH Ensemble drops closer to that of Adapt-D, while its running time becomes relatively faster than the latter. This is because LSH Ensemble does not need to read any posting lists, and the candidate retrieval time is purely in-memory and extremely fast, while Adapt-D must issue read operations for posting lists to retrieve candidates.

The third row of FIG. 15 compares the query memory footprint of LSH Ensemble and Adapt-D. Because Adapt-D needs to read posting lists in addition to sets, in some cases it may require using more memory than LSH Ensemble.

In some use cases, the LSH Ensemble may be selected if the user wants to retrieve many results (k>20) and the query size is large (more than 10 k), and particularly, if the user or system does not care very much about recall of the results. Otherwise, Adapt-D of the present embodiments presents a better approach as evidenced by the example experiment.

In further embodiments, two or more approaches can be executed by the system 110 in parallel or sequentially; for example, running both the LSH Ensemble approach and the Adapt-D approach of the present embodiments in parallel. In this example, the most likely candidates from the LSH index (using the highest threshold) can be returned first for a preview, and then the results can be refined using the exact top-k provided by the Adapt-D approach.

Although the invention has been described with reference to certain specific embodiments, various modifications thereof will be apparent to those skilled in the art without departing from the spirit and scope of the invention as outlined in the claims appended hereto.

The invention claimed is:

1. A computer-implemented method for set overlap searching of a data lake, the data lake having input tables associated therewith, the input tables comprising table columns and data values, the input tables having an inverted index associated therewith, the inverted index comprising the data values and respective posting lists, the posting lists comprising pointers to sets of the table columns, the method comprising:
   determining the inverted index by:
      extracting a raw tokens table from the data values of the input tables, comprising:
         converting the input tables to sets;
         assigning set identifiers to each of the sets; and
         determining the raw tokens table as a collection of tuples, the tuples comprising the data values and associated set identifiers
      building a token table from the raw tokens table;
      determining the posting lists from the token table; and
      determining the inverted index by associating each of the data values with the respective posting list;
   receiving a query set of data values to be searched;
   receiving a requested set quantity;
   while a comparison condition is true, the comparison condition based on at least a size of the query set, iteratively performing:
      determining whether a first net cost of reading a candidate set is greater than a second net cost of reading an unread one of the posting lists, the candidate set comprising one of the sets;
      where the first net cost is greater than the second net cost, reading the unread one of the posting lists from the inverted index and pruning the candidate sets based on a position filter; and
      where the first net cost is not greater than the second net cost, determining whether the overlap between the query set and the candidate set is greater than the lowest ranked candidate set in a heap, a total rank of the heap based at least on the requested set quantity, and where there is greater overlap, adding the candidate set to the heap; and
   outputting the heap.

2. The method of claim 1, wherein building the token table from the raw tokens table comprises:
   determining a first mapping of entries in the raw token table to respective token identifiers;
   determining duplicate groups by determining starting positions and ending positions of pairs of adjacent posting lists;
   determining a group identifier for each duplicate group as the starting position and the ending position of such duplicate group;
   determining a second mapping of the token identifiers to the group identifiers; and joining the first mapping and the second mapping into the token table.

3. The method of claim 2, further comprising determining integer sets in the token table by:
converting strings in the raw token table to integers;
determining a resultant table by combining the raw tokens table with the token table;
grouping the resultant table by the set identifiers; and
sorting the resultant table by the token identifiers.

4. The method of claim 1, further comprising:
determining a dictionary comprising a mapping of the data values to the respective pointers;
updating the query set to include only the tokens of the query set that are in the dictionary;
sorting the query set using global ordering;
initializing a hash map of unread candidate sets to empty;
initializing a pointer to one; and
assigning a prefix length as a size of the query set minus a size of an overlap between the query set and a candidate set having a rank of the requested set quantity.

5. The method of claim 4, wherein the comparison condition is evaluated as true if the pointer is less than or equal to the prefix length or the hash map of unread candidate sets is not empty.

6. The method of claim 5, further comprising assigning a best unread candidate to the candidate set when the comparison condition is true, the best unread candidate selected to minimize the first net cost.

7. The method of claim 6, wherein the first net cost is determined as a time incurred to read the candidate set minus a first read time saved, the first read time saved determined as an addition of a first time and a second time, the first time being the time required to read eliminated posting lists, and the second time being the time required to read eliminated candidate sets.

8. The method of claim 5, wherein the second net cost is determined as a time incurred to read the posting lists minus a second read time saved, the second read time saved determined as a sum over all unread candidates sets, the sum comprising a time required to read a next batch of posting lists added to a time required to read a candidate set due to updating the position filter.

9. A system for set overlap searching of a data lake, the data lake having input tables associated therewith, the input tables comprising table columns and data values, the input tables having an inverted index associated therewith, the inverted index comprising the data values and respective posting lists, the posting lists comprising pointers to sets of the table columns, the system having one or more processors and a data storage device, the one or more processors in communication with the data storage device and configured to execute:
an indexing module to determine the inverted index by:
extracting a raw tokens table from the data values of the input tables, comprising:
converting the input tables to sets;
assigning set identifiers to each of the sets; and
determining the raw tokens table as a collection of tuples, the tupls comprising the data values and associated set identifiers;
building a token table from the raw tokens table;
determining the posting lists from the token table; and
determining the inverted index by associating each of the data values with the respective posting list
an input module to receive a query set of data values to be searched and receive a requested set quantity;
a search engine to, while a comparison condition is true, the comparison condition based on at least a size of the query set, iteratively perform:
determining whether a first net cost of reading a candidate set is greater than a second net cost of reading an unread one of the posting lists, the candidate set comprising one of the sets;
where the first net cost is greater than the second net cost, reading the unread one of the posting lists from the inverted index and pruning the candidate sets based on a position filter; and
where the first net cost is not greater than the second net cost, determining whether the overlap between the query set and the candidate set is greater than the lowest ranked candidate set in a heap, a total rank of the heap based at least on the requested set quantity, and where there is greater overlap, adding the candidate set to the heap; and
an output module to output the heap.

10. The system of claim 9, wherein building the token table from the raw tokens table comprises:
determining a first mapping of entries in the raw token table to respective token identifiers;
determining duplicate groups by determining starting positions and ending positions of pairs of adjacent posting lists;
determining a group identifier for each duplicate group as the starting position and the ending position of such duplicate group;
determining a second mapping of the token identifiers to the group identifiers; and
joining the first mapping and the second mapping into the token table.

11. The system of claim 10, wherein the indexing module is further executable to creating integer sets in the token table by:
converting strings in the raw token table to integers;
determining a resultant table by combining the raw tokens table with the token table;
grouping the resultant table by the set identifiers; and
sorting the resultant table by the token identifiers.

12. The system of claim 11, wherein the search engine is further executable to:
determine a dictionary comprising a mapping of the data values to the respective pointers;
update the query set to include only the tokens of the query set that are in the dictionary;
sort the query set using global ordering;
initialize a hash map of unread candidate sets to empty;
initialize a pointer to one; and
assign a prefix length as a size of the query set minus a size of an overlap between the query set and a candidate set having a rank of the requested set quantity.

13. The system of claim 12, wherein the comparison condition is evaluated as true if the pointer is less than or equal to the prefix length or the hash map of unread candidate sets is not empty.

14. The system of claim 13, wherein the search engine is further executable to assign a best unread candidate to the candidate set when the comparison condition is true, the best unread candidate selected to minimize the first net cost.

15. The system of claim 14, wherein the first net cost is determined as a time incurred to read the candidate set minus a first read time saved, the first read time saved determined as an addition of a first time and a second time, the first time being the time required to read eliminated posting lists, and the second time being the time required to read eliminated candidate sets.

16. The system of claim 13, wherein the second net cost is determined as a time incurred to read the posting lists minus a second read time saved, the second read time saved determined as a sum over all unread candidates sets, the sum comprising a time required to read a next batch of posting lists added to a time required to read a candidate set due to updating the position filter.

* * * * *